United States Patent
Yoo et al.

(10) Patent No.: US 11,750,813 B2
(45) Date of Patent: Sep. 5, 2023

(54) METHOD AND DEVICE FOR CODING TRANSFORM COEFFICIENT

(71) Applicant: LG ELECTRONICS INC., Seoul (KR)

(72) Inventors: Sunmi Yoo, Seoul (KR); Jungah Choi, Seoul (KR); Seunghwan Kim, Seoul (KR); Jangwon Choi, Seoul (KR); Jin Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/882,934

(22) Filed: Aug. 8, 2022

(65) Prior Publication Data

US 2022/0385925 A1 Dec. 1, 2022

Related U.S. Application Data

(63) Continuation of application No. 17/281,893, filed as application No. PCT/KR2019/013043 on Oct. 4, 2019, now Pat. No. 11,470,319.

(Continued)

(51) Int. Cl.
*H04N 19/124* (2014.01)
*H04N 19/132* (2014.01)
(Continued)

(52) U.S. Cl.
CPC ........... *H04N 19/124* (2014.11); *H04N 19/12* (2014.11); *H04N 19/132* (2014.11); *H04N 19/176* (2014.11); *H04N 19/18* (2014.11); *H04N 19/184* (2014.11); *H04N 19/70* (2014.11); *H04N 19/159* (2014.11)

(58) Field of Classification Search
CPC .... H04N 19/124; H04N 19/12; H04N 19/132; H04N 19/176; H04N 19/18; H04N 19/184; H04N 19/70; H04N 19/159
See application file for complete search history.

(56) References Cited

U.S. PATENT DOCUMENTS 9,794,591 B2 10/2017 Ström et al.
9,813,713 B2 11/2017 Tsukuba et al.
(Continued)

FOREIGN PATENT DOCUMENTS

KR 1020180044969 A 5/2018
WO 2017-086765 A2 5/2017

OTHER PUBLICATIONS

Joint Video Experts Team (JVET) of ITU-T SG 16 WP 3 and ISO/IEC JTC 1/SC 29/WG 11, Jul. 10-18, 2018, JVET-K1001-v6.
(Continued)

*Primary Examiner* — Fabio S Lima
(74) *Attorney, Agent, or Firm* — Bryan Cave Leighton Paisner LLP

(57) ABSTRACT

An image decoding method according to the present document comprises the steps of: receiving a bitstream including residual information; deriving a quantized transform coefficient for a current block on the basis of the residual information included in the bitstream; deriving a residual sample for the current block on the basis of the quantized transform coefficient; and generating a reconstructed picture on the basis of the residual sample for the current block, wherein the residual information may be derived via different syntax elements depending on whether a transform has been applied to the current block.

14 Claims, 16 Drawing Sheets

Related U.S. Application Data

(60) Provisional application No. 62/741,638, filed on Oct. 5, 2018.

(51) Int. Cl.
*H04N 19/176* (2014.01)
*H04N 19/18* (2014.01)
*H04N 19/184* (2014.01)
*H04N 19/70* (2014.01)
*H04N 19/12* (2014.01)
*H04N 19/159* (2014.01)

(56) References Cited

U.S. PATENT DOCUMENTS

| | | | |
|---|---|---|---|
| 2013/0182757 A1 | 7/2013 | Karczewicz | H04N 19/13 375/240.18 |
| 2015/0023405 A1 | 1/2015 | Joshi | H04N 19/117 375/240.02 |
| 2015/0103918 A1 | 4/2015 | Wang et al. | |
| 2020/0036969 A1 | 1/2020 | Sarwer | H04N 19/157 |
| 2020/0077117 A1 | 3/2020 | Karczewicz | H04N 19/18 |
| 2020/0329257 A1 | 10/2020 | Zhao | H04N 19/615 |
| 2021/0329284 A1 | 10/2021 | Bossen | H04N 19/46 |
| 2022/0014787 A1 | 1/2022 | Y00; Sunnni | H04N 19/60 |

OTHER PUBLICATIONS

Choi et al. "CE7-related: High throughput coefficient coding depending on the sub-block size." JVET-L0325, Joint Video Experts Team (JVET) of ITU-TSG 16 WP 3 and ISO/IEC JTC 1/SC 29/WG 11, 12th Meeting: Macao, CN,Oct. 3 (Year: 2018).

Choi, Jung-ah, et al. "CE7-related: High throughput coefficient coding depending on the sub-block size." JVET-L0325, Joint Video Experts Team (JVET) of ITU-TSG 16 WP 3 and ISO/IEC JTC 1/SC 29/WG 11, 12th Meeting: Macao, CN, Oct. 3, 2018, pp. 1-8, see pp. 1-3.

METHOD AND DEVICE FOR CODING TRANSFORM COEFFICIENT

CROSS-REFERENCE TO RELATED APPLICATIONS

This application is a Continuation of U.S. patent application Ser. No. 17/281,893, filed Mar. 31, 2021, which is a National Stage filing under 35 U.S.C. 371 of International Application No. PCT/KR2019/013043, filed on Oct. 4, 2019, which claims the benefit of U.S. Provisional Application No. 62/741,638, filed on Oct. 5, 2018, the contents of which are all hereby incorporated by reference herein in their entirety.

BACKGROUND OF THE DISCLOSURE

Field of the Disclosure

The present disclosure relates generally to image coding technology and, more particularly, to a method and apparatus for coding a transform coefficient.

Related Art

Recently, the demand for high resolution, high quality image/video such as 4K, 8K or more Ultra High Definition (UHD) image/video is increasing in various fields. As the image/video resolution or quality becomes higher, relatively more amount of information orbits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY

The present disclosure is to provide a method and apparatus for improving image coding efficiency.

The present disclosure is also to provide a method and apparatus for improving efficiency of residual coding.

The present disclosure is also to provide a method and apparatus for improving the efficiency of residual coding according to whether or not transform skip is applied.

According to an embodiment of the present disclosure, there is provided an image decoding method performed by a decoding apparatus, the method including: receiving a bitstream including residual information; deriving a quantized transform coefficient for a current block based on the residual information included in the bitstream; deriving a residual sample for the current block based on the quantized transform coefficient; and generating a reconstructed picture based on the residual sample for the current block, wherein the residual information may be derived through different syntax elements depending on whether or not a transform is applied to the current block.

The residual information includes a first transform coefficient level flag for whether or not a transform coefficient level for the quantized transform coefficient is greater than a first threshold value, and a second transform coefficient level flag for whether or not the transform coefficient level of the quantized transform coefficient is greater than a second threshold value, and wherein the second transform coefficient level flag is decoded in different ways depending on whether or not a transform is applied to the current block.

The residual information includes a context syntax element coded based on a context, and wherein the context syntax element includes a significant coefficient flag related to whether or not the quantized transform coefficient is a non-zero significant coefficient, a parity level flag for a parity of a transform coefficient level for the quantized transform coefficient, a first transform coefficient level flag for whether or not the transform coefficient level is greater than a first threshold value, and a second transform coefficient level flag for whether or not the transform coefficient level of the quantized transform coefficient is greater than a second threshold value.

The step of deriving the quantized transform coefficient includes: decoding the first transform coefficient level flag, and decoding the parity level flag; and deriving the quantized transform coefficient based on a value of the decoded parity level flag and a value of the decoded first transform coefficient level flag, and wherein the decoding of the first transform coefficient level flag is performed prior to the decoding of the parity level flag.

According to another embodiment of the present disclosure, there is provided an image encoding method by an encoding apparatus, the method including: deriving a residual sample for a current block; deriving a quantized transform coefficient based on the residual sample for the current block; and encoding residual information including information on the quantized transform coefficient, wherein the residual information may be derived through different syntax elements depending on whether or not a transform is applied to the current block.

According to still another embodiment of the present disclosure, an image decoding apparatus for performing an image decoding method includes: an entropy decoder which receives a bitstream including residual information, and derives a quantized transform coefficient for a current block based on the residual information included in the bitstream; an inverse transformer which derives a residual sample for the current block based on the quantized transform coefficient; and an adder which generates a reconstructed picture based on the residual sample for the current block, wherein the residual information may be derived through different syntax elements depending on whether or not a transform is applied to the current block.

According to still another embodiment of the present disclosure, there is provided an encoding apparatus for performing image encoding. The encoding apparatus includes a subtractor which derives a residual sample for a current block, a quantizer which derives a quantized transform coefficient based on the residual sample for the current block; and an entropy encoder which encodes residual information including information on the quantized transform coefficient, wherein the residual information may be derived through different syntax elements depending on whether or not a transform is applied to the current block.

According to still another embodiment of the present disclosure, a digital storage medium in which image data including encoded image information generated according to the image encoding method performed by an encoding apparatus is stored may be provided.

According to still another embodiment of the present disclosure, a digital storage medium in which image data including encoded image information causing the decoding apparatus to perform the image decoding method is stored may be provided.

According to an embodiment of the present disclosure, it is possible to improve general image/video compression efficiency.

According to an embodiment of the present disclosure, it is possible to improve the efficiency of residual coding.

According to the present disclosure, it is possible to improve the efficiency of transform coefficient coding.

According to the present disclosure, it is possible to improve the efficiency of residual coding according to whether or not transform skip is applied.

DESCRIPTION OF EMBODIMENTS

Figure 1:
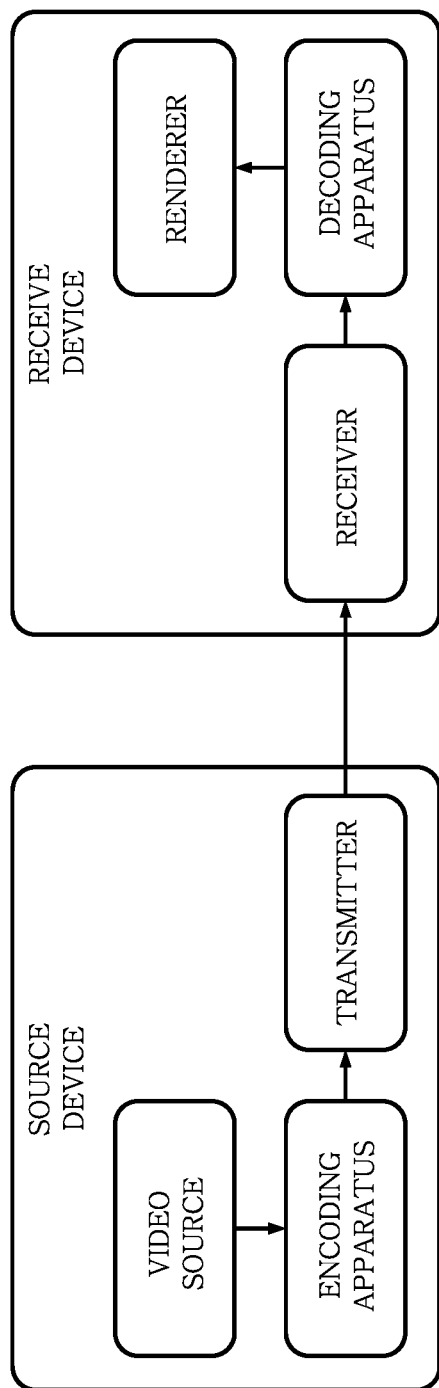
FIG. 1 schematically represents an example of a video/image coding system to which the present disclosure may be applied.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, each component on the drawings described herein is illustrated independently for convenience of description as to characteristic functions different from each other, and however, it is not meant that each component is realized by a separate hardware or software. For example, any two or more of these components may be combined to form a single component, and any single component may be divided into plural components. The embodiments in which components are combined and/or divided will belong to the scope of the patent right of the present document as long as they do not depart from the essence of the present document.

Hereinafter, examples of the present embodiment will be described in detail with reference to the accompanying drawings. In addition, like reference numerals are used to indicate like elements throughout the drawings, and the same descriptions on the like elements will be omitted.

FIG. 1 illustrates an example of a video/image coding system to which the present disclosure may be applied.

Referring to FIG. 1, a video/image coding system may include a source device and a reception device. The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

This document relates to video/image coding. For example, a method/embodiment disclosed in this document may be applied to a method disclosed in the versatile video coding (VVC) standard, the essential video coding (EVC) standard, the AOMedia Video 1 (AV1) standard, the 2nd generation of audio video coding standard (AVS2) or the next generation video/image coding standard (e.g., H.267, H.268, or the like).

This document suggests various embodiments of video/image coding, and the above embodiments may also be performed in combination with each other unless otherwise specified.

In this document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture (a brick may represent a rectangular region of CTU rows within a tile in a picture). A tile may be partitioned into a multiple bricks, each of which may be constructed with one or more CTU rows within the tile (A tile may be partitioned into multiple bricks, each of which consisting of one or more CTU rows within the tile). A tile that is not partitioned into multiple bricks may also be referred to as a brick. A brick scan may represent a specific sequential ordering of CTUs partitioning a picture, wherein the CTUs may be ordered in a CTU raster scan within a brick, and bricks within a tile may be ordered consecutively in a raster scan of the bricks of the tile, and tiles in a picture may be ordered consecutively in a raster scan of the tiles of the picture (A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture). A tile is a particular tile column and a rectangular region of CTUs within a particular tile column (A tile is a rectangular region of CTUs within a particular tile column and a particular tile row in a picture). The tile column is a rectangular region of CTUs, which has a height equal to the height of the picture and a width that may be specified by syntax elements in the picture parameter set (The tile column is a rectangular region of CTUs having a height equal to the height of the picture and a width specified by syntax elements in the picture parameter set). The tile row is a rectangular region of CTUs, which has a width specified by syntax elements in the picture parameter set and a height that may be equal to the height of the picture (The tile row is a rectangular region of CTUs having a height specified by syntax elements in the picture parameter set and a width equal to the width of the picture). A tile scan may represent a specific sequential ordering of CTUs partitioning a picture, and the CTUs may be ordered consecutively in a CTU raster scan in a tile, and tiles in a picture may be ordered consecutively in a raster scan of the tiles of the picture (A tile scan is a specific sequential ordering of CTUs partitioning a picture in which the CTUs are ordered consecutively in CTU raster scan in a tile whereas tiles in a picture are ordered consecutively in a raster scan of the tiles of the picture). A slice may include an integer number of bricks of a picture, and the integer number of bricks may be included in a single NAL unit (A slice includes an integer number of bricks of a picture that may be exclusively contained in a single NAL unit). A slice may be constructed with multiple complete tiles, or may be a consecutive sequence of complete bricks of one tile (A slice may consists of either a number of complete tiles or only a consecutive sequence of complete bricks of one tile). In this document, a tile group and a slice may be used in place of each other. For example, in this document, a tile group/tile group header may be referred to as a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In this document, the symbol "/" and "," should be interpreted as "and/or." For example, the expression "A/B" is interpreted as "A and/or B", and the expression "A, B" is interpreted as "A and/or B." Additionally, the expression "A/B/C" means "at least one of A, B, and/or C." Further, the expression "A, B, C" also means "at least one of A, B, and/or C." (In this document, the term "/"and"," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C.")

Additionally, in the present document, the term "or" should be interpreted as "and/or." For example, the expression "A or B" may mean 1) only "A", 2) only "B", and/or 3) "both A and B." In other words, the term "or" in the present document may mean "additionally or alternatively." (Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively.")

Figure 2:
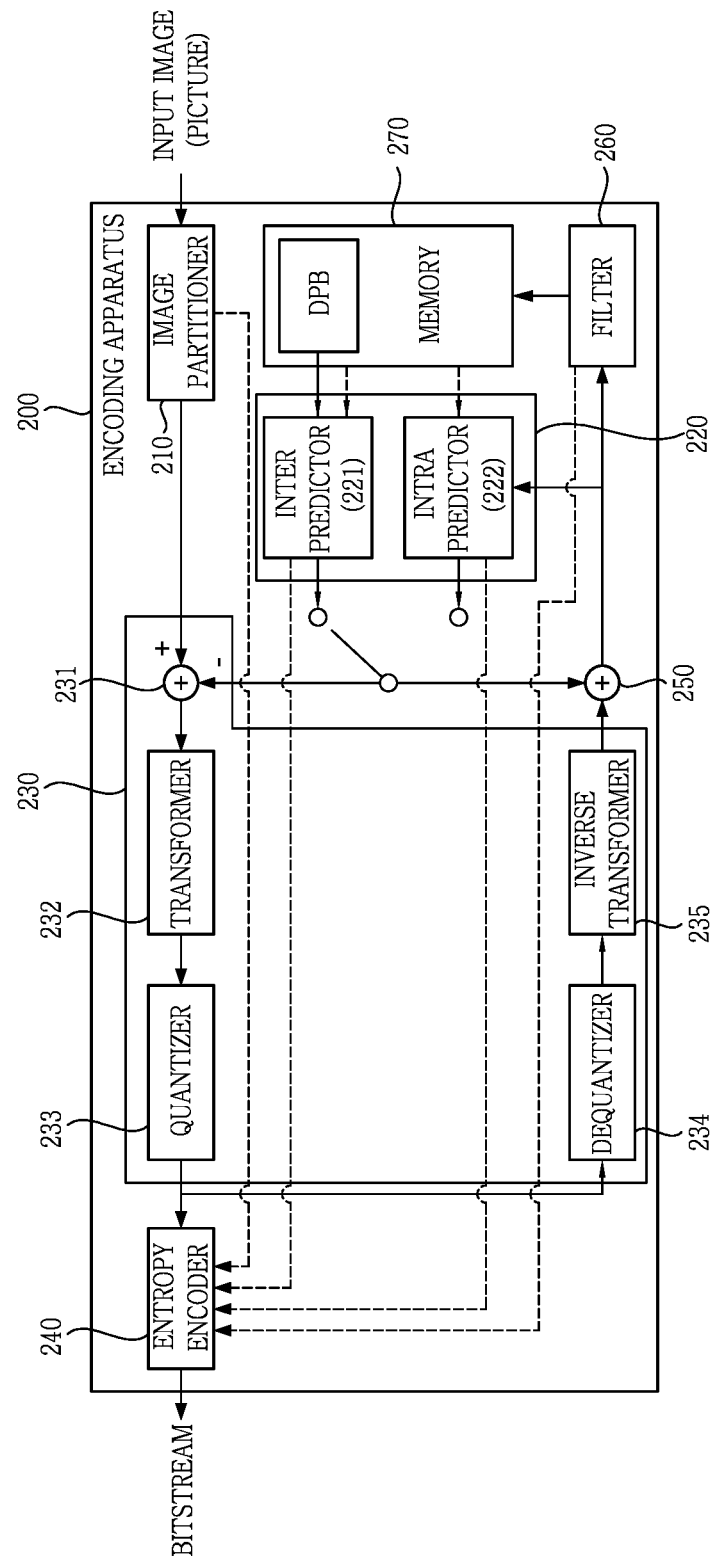
FIG. 2 is a diagram schematically illustrating a configuration of a video/image encoding apparatus to which the present disclosure may be applied.

FIG. 2 is a diagram schematically illustrating a configuration of a video/image encoding apparatus to which the present document may be applied. Hereinafter, what is referred to as the video encoding apparatus may include an image encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding procedure according to the present disclosure may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding procedure may include a procedure such as prediction, transform, and reconstruction to be described later. As another example, the processing unit may further include a prediction unit (PU) or a transform unit (TU). In this case, each of the prediction unit and the transform unit may be split or partitioned from the aforementioned final coding unit. The prediction unit may be a unit of sample prediction, and the transform unit may be a unit for inducing a transform coefficient and/or a unit for inducing a residual signal from the transform coefficient.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

The encoding apparatus 200 may generate a residual signal (residual block, residual sample array) by subtracting a predicted signal (predicted block, prediction sample array) output from the inter predictor 221 or the intra predictor 222 from the input image signal (original block, original sample array), and the generated residual signal is transmitted to the transformer 232. In this case, as illustrated, the unit for subtracting the predicted signal (predicted block, prediction sample array) from the input image signal (original block, original sample array) within an encoder 200 may be called the subtractor 231. The predictor may perform prediction for a block to be processed (hereinafter, referred to as a current block), and generate a predicted block including prediction samples of the current block. The predictor may determine whether intra prediction is applied or inter prediction is applied in units of the current block or the CU. The predictor may generate various information about prediction, such as prediction mode information, to transfer the generated information to the entropy encoder 240 as described later in the description of each prediction mode. The information about prediction may be encoded by the entropy encoder 240 to be output in a form of the bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 200 may generate a predicted signal based on various prediction methods to be described later. For example, the predictor may not only apply the intra prediction or the inter prediction for predicting one block, but also simultaneously apply the intra prediction and the inter prediction. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, a sample value in a picture may be signaled based on information on a palette index and a palette table.

The predicted signal generated through the predictor (including the inter predictor 221 and/or the intra predictor 222) may be used to generate a reconstructed signal or used to generate a residual signal. The transformer 232 may generate transform coefficients by applying the transform technique to the residual signal. For example, the transform technique may include at least one of a discrete cosine transform (DCT), a discrete sine transform (DST), a Karhunen-Loeve transform (KLT), a graph-based transform (GBT), or a conditionally non-linear transform (CNT). Here, when the relationship information between pixels is illustrated as a graph, the GBT means the transform obtained from the graph. The CNT means the transform which is acquired based on a predicted signal generated by using all previously reconstructed pixels. In addition, the transform process may also be applied to a pixel block having the same size of the square, and may also be applied to the block having a variable size rather than the square.

The quantizer 233 may quantize the transform coefficients to transmit the quantized transform coefficients to the entropy encoder 240, and the entropy encoder 240 may encode the quantized signal (information about the quantized transform coefficients) to the encoded quantized signal to the bitstream. The information about the quantized transform coefficients may be called residual information. The quantizer 233 may rearrange the quantized transform coefficients having a block form in a one-dimensional vector form based on a coefficient scan order, and also generate the information about the quantized transform coefficients based on the quantized transform coefficients of the one dimensional vector form. The entropy encoder 240 may perform various encoding methods, for example, such as an exponential Golomb coding, a context-adaptive variable length coding (CAVLC), and a context-adaptive binary arithmetic coding (CABAC). The entropy encoder 240 may also encode information (e.g., values of syntax elements and the like) necessary for reconstructing video/image other than the quantized transform coefficients together or separately. The encoded information (e.g., encoded video/image information) may be transmitted or stored in units of network abstraction layer (NAL) unit in a form of the bitstream. The video/image information may further include information about various parameter sets such as an adaptation parameter set (APS), a picture parameter set (PPS), a sequence parameter set (SPS), or a video parameter set (VPS). In addition, the video/image information may further include general constraint information. The signaled/transmitted information and/or syntax elements to be described later in this document may be encoded through the aforementioned encoding procedure and thus included in the bitstream. The bitstream may be transmitted through a network, or stored in a digital storage medium. Here, the network may include a broadcasting network and/or a communication network, or the like, and the digital storage medium may include various storage media such as USB, SD, CD, DVD, Blue-ray, HDD, and SSD. A transmitter (not illustrated) for transmitting the signal output from the entropy encoder 240 and/or a storage (not illustrated) for storing the signal may be configured as the internal/external elements of the encoding apparatus 200, or the transmitter may also be included in the entropy encoder 240.

The quantized transform coefficients output from the quantizer 233 may be used to generate a predicted signal. For example, the dequantizer 234 and the inverse transformer 235 apply dequantization and inverse transform to the quantized transform coefficients, such that the residual signal (residual block or residual samples) may be reconstructed. The adder 250 adds the reconstructed residual signal to the predicted signal output from the inter predictor 221 or the intra predictor 222, such that the reconstructed signal (reconstructed picture, reconstructed block, reconstructed sample array) may be generated. As in the case where the skip mode is applied, if there is no residual for the block to be processed, the predicted block may be used as the reconstructed block. The adder 250 may be called a reconstructor or a reconstructed block generator. The generated reconstructed signal may be used for the intra prediction of the next block to be processed within the current picture, and as described later, also used for the inter prediction of the next picture through filtering.

Meanwhile, a luma mapping with chroma scaling (LMCS) may also be applied in a picture encoding and/or reconstruction process.

The filter 260 may apply filtering to the reconstructed signal, thereby improving subjective/objective image qualities. For example, the filter 260 may apply various filtering methods to the reconstructed picture to generate a modified reconstructed picture, and store the modified reconstructed picture in the memory 270, specifically, the DPB of the memory 270. Various filtering methods may include, for example, a deblocking filtering, a sample adaptive offset, an adaptive loop filter, a bilateral filter, and the like. The filter 260 may generate various filtering-related information to transfer the generated information to the entropy encoder 240, as described later in the description of each filtering method. The filtering-related information may be encoded by the entropy encoder 240 to be output in a form of the bitstream.

The modified reconstructed picture transmitted to the memory 270 may be used as the reference picture in the inter predictor 221. If the inter prediction is applied by the inter predictor, the encoding apparatus may avoid the prediction mismatch between the encoding apparatus 200 and the decoding apparatus, and also improve coding efficiency.

The DPB of the memory 270 may store the modified reconstructed picture to be used as the reference picture in the inter predictor 221. The memory 270 may store motion information of the block in which the motion information within the current picture is derived (or encoded) and/or motion information of the blocks within the previously reconstructed picture. The stored motion information may be transferred to the inter predictor 221 to be utilized as motion information of the spatial neighboring block or motion information of the temporal neighboring block. The memory 270 may store the reconstructed samples of the reconstructed blocks within the current picture, and transfer the reconstructed samples to the intra predictor 222.

Figure 3:
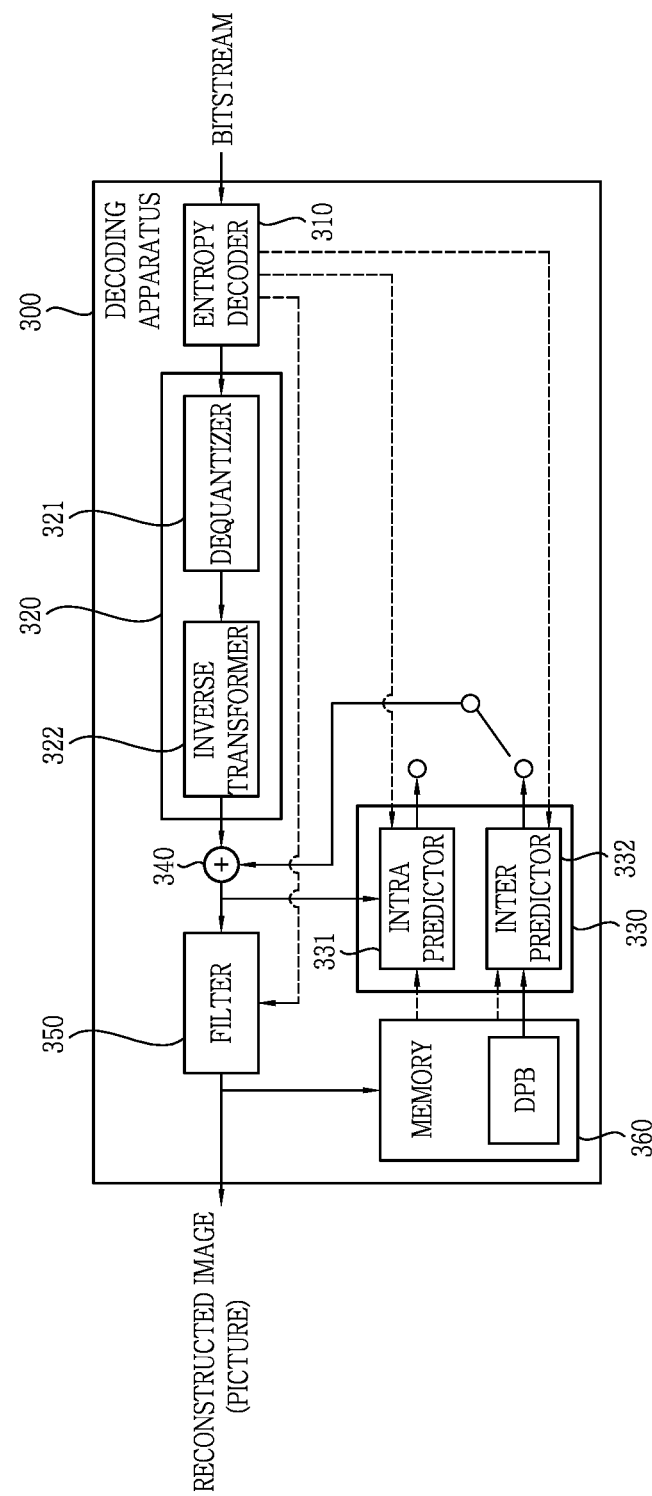
FIG. 3 is a diagram schematically illustrating a configuration of a video/image decoding apparatus to which the present disclosure may be applied.

FIG. 3 is a diagram for schematically explaining a configuration of a video/image decoding apparatus to which the present disclosure is applicable.

Referring to FIG. 3, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive the signal output from the encoding apparatus illustrated in FIG. 2 in a form of the bitstream, and the received signal may be decoded through the entropy decoder 310. For example, the entropy decoder 310 may derive information (e.g., video/image information) necessary for the image reconstruction (or picture reconstruction) by parsing the bitstream. The video/image information may further include information about various parameter sets such as an adaptation parameter set (APS), a picture parameter set (PPS), a sequence parameter set (SPS), and a video parameter set (VPS). In addition, the video/image information may further include general constraint information. The decoding apparatus may decode the picture further based on the information about the parameter set and/or the general constraint information. The signaled/received information and/or syntax elements to be described later in this document may be decoded through the decoding procedure and acquired from the bitstream. For example, the entropy decoder 310 may decode information within the bitstream based on a coding method such as an exponential Golomb coding, a CAVLC, or a CABAC, and output a value of the syntax element necessary for the image reconstruction, and the quantized values of the residual-related transform coefficient. More specifically, the CABAC entropy decoding method may receive a bin corresponding to each syntax element from the bitstream, determine a context model using syntax element information to be decoded and decoding information of the neighboring block and the block to be decoded or information of the symbol/bin decoded in the previous stage, and generate a symbol corresponding to a value of each syntax element by predicting the probability of generation of the bin according to the determined context model to perform the arithmetic decoding of the bin. At this time, the CABAC entropy decoding method may determine the context model and then update the context model using the information of the decoded symbol/bin for a context model of a next symbol/bin. The information about prediction among the information decoded by the entropy decoder 310 may be provided to the predictor (the inter predictor 332 and the intra predictor 331), and a residual value at which the entropy decoding is performed by the entropy decoder 310, that is, the quantized transform coefficients and the related parameter information may be input to the residual processor 320. The residual processor 320 may derive a residual signal (residual block, residual samples, residual sample array). In addition, the information about filtering among the information decoded by the entropy decoder 310 may be provided to the filter 350. Meanwhile, a receiver (not illustrated) for receiving the signal output from the encoding apparatus may be further configured as the internal/external element of the decoding apparatus 300, or the receiver may also be a component of the entropy decoder 310. Meanwhile, the decoding apparatus according to this document may be called a video/image/picture decoding apparatus, and the decoding apparatus may also be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

The predictor 330 may perform the prediction of the current block, and generate a predicted block including the prediction samples of the current block. The predictor may determine whether the intra prediction is applied or the inter prediction is applied to the current block based on the information about prediction output from the entropy decoder 310, and determine a specific intra/inter prediction mode.

The predictor may generate the predicted signal based on various prediction methods to be described later. For example, the predictor may not only apply the intra prediction or the inter prediction for the prediction of one block, but also apply the intra prediction and the inter prediction at the same time. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, information on a palette table and a palette index may be included in the video/image information and signaled.

The intra predictor 331 may predict the current block with reference to the samples within the current picture. The referenced samples may be located neighboring to the current block according to the prediction mode, or may also be located away from the current block. The prediction modes in the intra prediction may include a plurality of non-directional modes and a plurality of directional modes. The intra predictor 331 may also determine the prediction mode applied to the current block using the prediction mode applied to the neighboring block.

The inter predictor 332 may induce the predicted block of the current block based on the reference block (reference sample array) specified by the motion vector on the reference picture. At this time, in order to decrease the amount of the motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. For example, the inter predictor 332 may configure a motion information candidate list based on the neighboring blocks, and derive the motion vector and/or the reference picture index of the current block based on received candidate selection information. The inter prediction may be performed based on various prediction modes, and the information about the prediction may include information indicating the mode of the inter prediction of the current block.

The adder 340 may add the acquired residual signal to the predicted signal (predicted block, prediction sample array) output from the predictor (including the inter predictor 332 and/or the intra predictor 331) to generate the reconstructed signal (reconstructed picture, reconstructed block, reconstructed sample array). As in the case where the skip mode is applied, if there is no residual for the block to be processed, the predicted block may be used as the reconstructed block.

The adder 340 may be called a reconstructor or a reconstructed block generator. The generated reconstructed signal may be used for the intra prediction of a next block to be processed within the current picture, and as described later, may also be output through filtering or may also be used for the inter prediction of a next picture.

Meanwhile, a luma mapping with chroma scaling (LMCS) may also be applied in the picture decoding process.

The filter 350 may apply filtering to the reconstructed signal, thereby improving the subjective/objective image qualities. For example, the filter 350 may apply various filtering methods to the reconstructed picture to generate a modified reconstructed picture, and transmit the modified reconstructed picture to the memory 360, specifically, the DPB of the memory 360. Various filtering methods may include, for example, a deblocking filtering, a sample adaptive offset, an adaptive loop filter, a bidirectional filter, and the like.

The (modified) reconstructed picture stored in the DPB of the memory 360 may be used as the reference picture in the inter predictor 332. The memory 360 may store motion information of the block in which the motion information within the current picture is derived (decoded) and/or motion information of the blocks within the previously reconstructed picture. The stored motion information may be transferred to the inter predictor 260 to be utilized as motion information of the spatial neighboring block or motion information of the temporal neighboring block. The memory 360 may store the reconstructed samples of the reconstructed blocks within the current picture, and transfer the stored reconstructed samples to the intra predictor 331.

In the present specification, the exemplary embodiments described in the filter 260, the inter predictor 221, and the intra predictor 222 of the encoding apparatus 200 may be applied equally to or to correspond to the filter 350, the inter predictor 332, and the intra predictor 331 of the decoding apparatus 300, respectively.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

Figure 4:
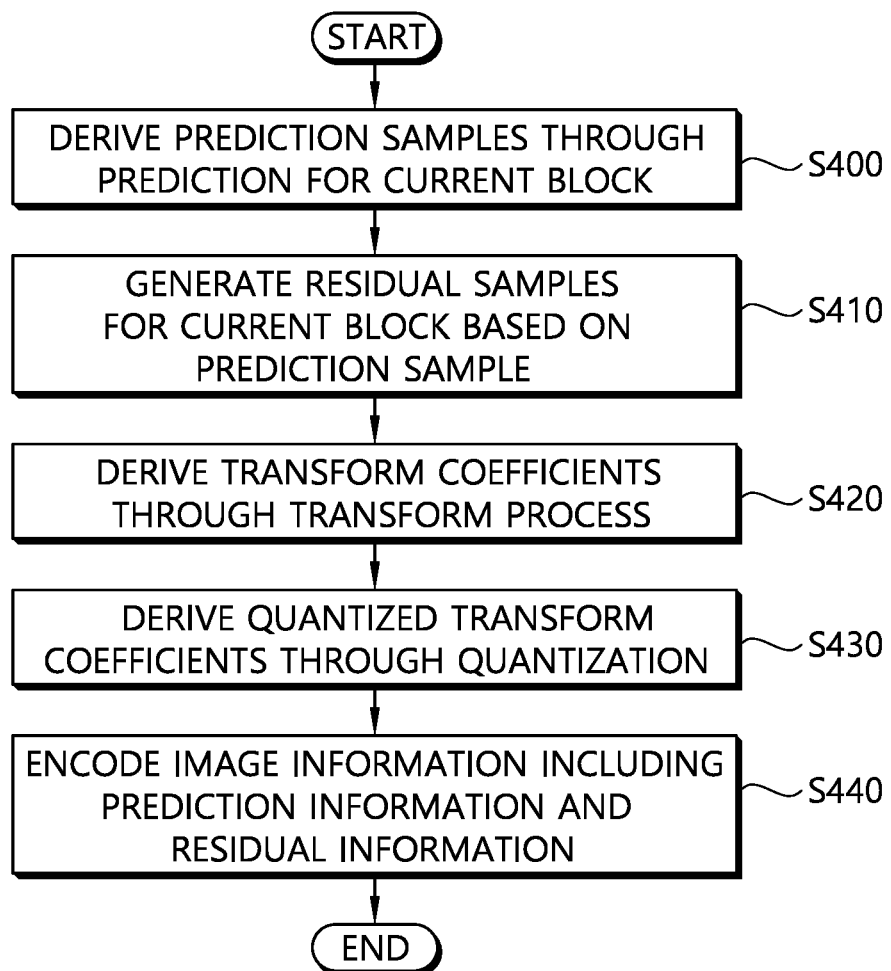
FIG. 4 is a control flowchart illustrating a video/image encoding method to which the present disclosure may be applied.

FIG. 4 is a control flowchart illustrating a video/image encoding method to which the present disclosure may be applied.

S400 may be performed by the inter predictor 221 or the intra predictor 222 of the encoding apparatus, and S410, S420, S430, and S440 may be performed by the subtractor 231, the transformer 232, the quantizer 233, and the entropy encoder 240 of the encoding apparatus, respectively.

The encoding apparatus may derive prediction samples through prediction for a current block (S400). The encoding apparatus may determine whether or not to perform inter prediction or intra prediction on the current block, and determine a specific inter prediction mode or a specific intra prediction mode based on RD cost. According to the determined mode, the encoding apparatus may derive prediction samples for the current block.

The encoding apparatus may compare the prediction samples with original samples for the current block, and derive residual samples (S410).

The encoding apparatus derives transform coefficients through a transform process for the residual samples (S420). By quantizing the derived transform coefficients, quantized transform coefficients are derived (S430).

The encoding apparatus may encode image information including prediction information and residual information, and output the encoded image information in the form of a bitstream (S440).

The prediction information may include an information on motion information (e.g., when the inter prediction is applied) and a prediction mode information as a plurality of informations related to the prediction process. The residual information may be information on the quantized transform coefficients, and, for example, include information disclosed in Table 1 to be described later. The residual information may be entropy coded.

The output bitstream may be delivered to the decoding apparatus through a storage medium or a network.

Figure 5:
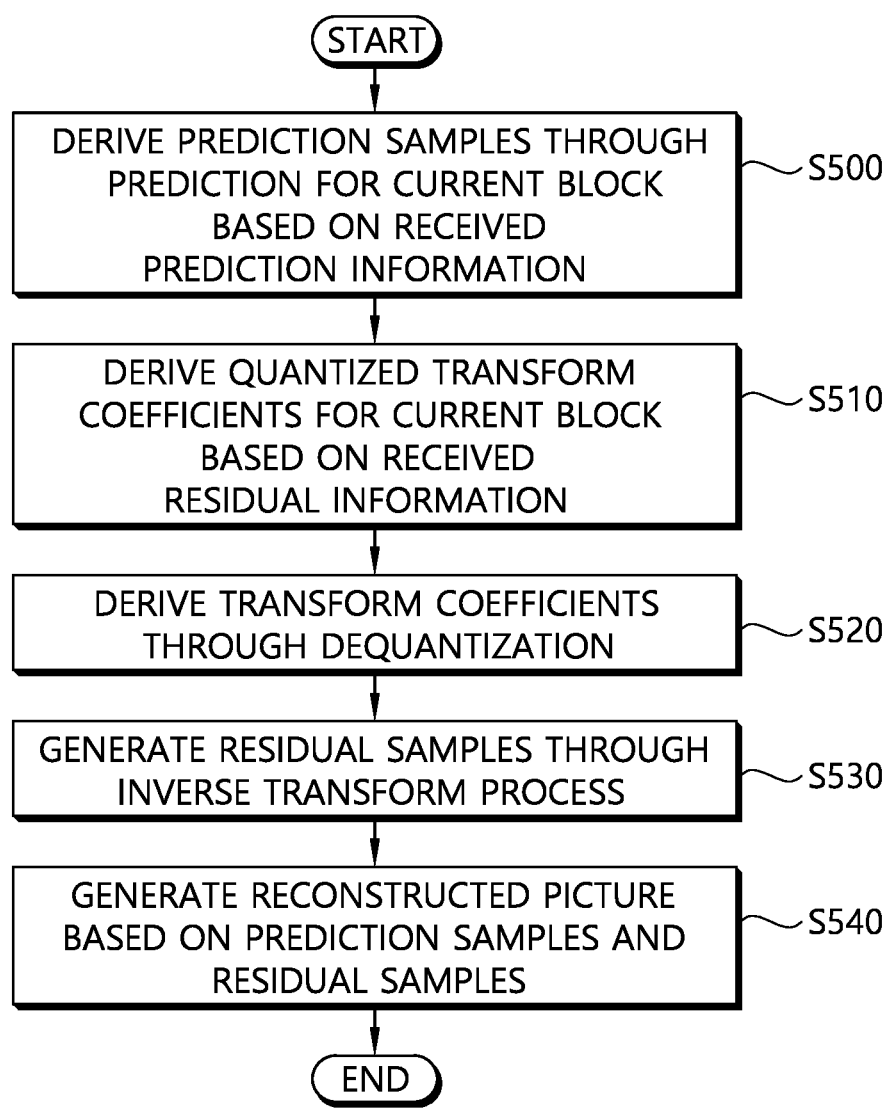
FIG. 5 is a control flowchart illustrating a video/image decoding method to which the present disclosure may be applied.

FIG. 5 is a control flowchart illustrating a video/image decoding method to which the present disclosure may be applied.

S500 may be performed by the inter predictor 332 or the intra predictor 331 of the decoding apparatus. In S500, a process of decoding prediction information included in a bitstream and deriving values of related syntax elements may be performed by the entropy decoder 310 of the encoding apparatus. S510, S520, S530, and S540 may be performed by the entropy decoder 310, the dequantizer 321, the inverse transformer 322, and the adder 340 of the decoding apparatus, respectively.

The decoding apparatus may perform an operation corresponding to the operation which has been performed in the encoding apparatus. The decoding apparatus may perform inter prediction or intra prediction on the current block and derive prediction samples, based on the received prediction information (S500).

The decoding apparatus may derive quantized transform coefficients for the current block based on the received residual information (S510). The decoding apparatus may derive the quantized transform coefficients from the residual information through entropy decoding.

The decoding apparatus may dequantize the quantized transform coefficients and derive transform coefficients (S520).

The decoding apparatus may derive residual samples through an inverse transform process for the transform coefficients (S530).

The decoding apparatus may generate the reconstructed samples for the current block based on the residual samples and the prediction samples, and generate the reconstructed picture based on these reconstructed samples. (S540).

As described above, after this, the in-loop filtering process may be further applied to the reconstructed picture.

Figure 6:
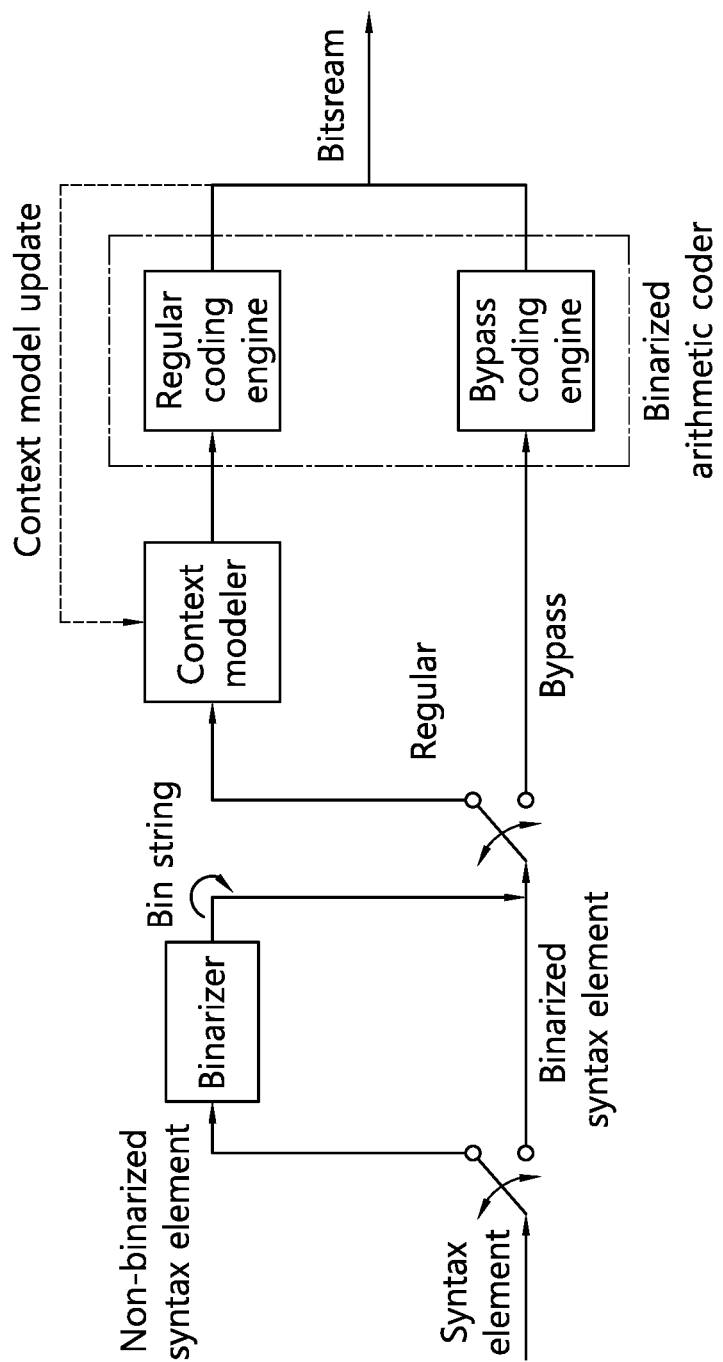
FIG. 6 is a diagram illustrating a block diagram of a CABAC encoding system according to an embodiment.

FIG. 6 shows a block diagram of context-adaptive binary arithmetic coding (CABAC) for encoding a single syntax element, as a diagram illustrating a block diagram of a CABAC encoding system according to an embodiment.

In a case where an input signal is a non-binarized syntax element, an encoding process of the CABAC first converts the input signal into a binarized value through binarization. In a case where an input signal is already a binarized value, the input signal bypasses the binarization without being subject to it, and input to an encoding engine. Here, each binary number 0 or 1 constituting the binary value is referred to as a bin. For example, in a case where a binary string after the binarization is '110', each of 1, 1, and 0 is referred to as a bin. The bin(s) for a syntax element may be a value of the syntax element.

Binarized bins are input to a regular encoding engine or a bypass encoding engine.

The regular encoding engine assigns to a corresponding bin a context model reflecting a probability value, and encodes the bin based on the assigned context model. After performing the encoding on each bin, the regular encoding engine may update a probability model for the bin. The thus encoded bins are referred to as context-coded bins.

The bypass encoding engine omits a process of estimating a probability for an input bin, and a process of updating the probability model which has been applied to the bin, after the encoding. The bypass encoding engine improves an encoding speed by encoding bins being input thereto while applying uniform probability distribution instead of assigning a context. The thus encoded bins are referred to as bypass bins.

The entropy encoding may determine whether to perform the encoding through the regular encoding engine or through the bypass encoding engine, and switch an encoding path. The entropy decoding performs the same processes as those of the encoding in a reverse order.

Meanwhile, in an embodiment, a (quantized) transform coefficient is encoded and/or decoded based on syntax elements, such as transform_skip_flag, last_sig_coeff_x_prefix, last_sig_coeff_y_prefix, last_sig_coeff_x_suffix, last_sig_coeff_y_suffix, coded_sub_block_flag, sig_coeff_flag, par_level_flag, rem_abs_gt1_flag, rem_abs_gt2_flag, abs_remainder, coeff_sign_flag, mts_idx and the like. Table 1 below shows syntax elements related to the residual data encoding according to an example.

TABLE 1

| Descriptor |
| --- |

```
residual_coding( x0, y0, log2TbWidth, log2TbHeight, cIdx ) {
  if( transform_skip_enabled_flag && ( cIdx != 0 || cu_mts_flag[ x0 ][ y0 ] = = 0 ) &&
    ( log2TbWidth <= 2 ) && ( log2TbHeight <= 2 ) )
```

TABLE 1-continued

| | Descriptor |
|---|---|
|     transform_skip_flag[ x0 ][ y0 ][ cIdx ] | ae(v) |
| last_sig_coeff_x_prefix | ae(v) |
| last_sig_coeff_y_prefix | ae(v) |
| if( last_sig_coeff_x_prefix > 3 ) | |
|     last_sig_coeff_x_suffix | ae(v) |
| if( last_sig_coeff_y_prefix > 3 ) | |
|     last_sig_coeff_y_suffix | ae(v) |
| log2SbSize = ( Min( log2TbWidth, log2TbHeight ) < 2 ? 1 : 2 ) | |
| numSbCoeff = 1 << ( log2SbSize << 1 ) | |
| lastScanPos = numSbCoeff | |
| lastSubBlock = ( 1 << ( log2TbWidth + log2TbHeight − 2 * log2SbSize ) ) − 1 | |
| do { | |
|   if( lastScanPos = = 0 ) { | |
|     lastScanPos = numSbCoeff | |
|     lastSubBlock− − | |
|   } | |
|   lastScanPos− − | |
|   xS = DiagScanOrder[ log2TbWidth − log2SbSize ][ log2TbHeight − log2SbSize ] | |
|               [ lastSubBlock ][ 0 ] | |
|   yS = DiagScanOrder[ log2TbWidth − log2SbSize ][ log2TbHeight − log2SbSize ] | |
|               [ lastSubBlock ][ 1 ] | |
|   xC = ( xS << log2SbSize ) + | |
|         DiagScanOrder[ log2SbSize ][ log2SbSize ][ lastScanPos ][ 0 ] | |
|   yC = ( yS << log2SbSize ) + | |
|         DiagScanOrder[ log2SbSize ][ log2SbSize ][ lastScanPos ][ 1 ] | |
| } while( ( xC != LastSignificantCoeffX ) || ( yC != LastSignificantCoeffY ) ) | |
| QState = 0 | |
| for( i = lastSubBlock; i >= 0; i− − ) { | |
|   startQStateSb = QState | |
|   xS = DiagScanOrder[ log2TbWidth − log2SbSize ][ log2TbHeight − log2SbSize ] | |
|               [ lastSubBlock ][ 0 ] | |
|   yS = DiagScanOrder[ log2TbWidth − log2SbSize ][ log2TbHeight − log2SbSize ] | |
|               [ lastSubBlock ][ 1 ] | |
|   inferSbDcSigCoeffFlag = 0 | |
|   if( ( i < lastSubBlock ) && ( i > 0 ) ) { | |
|     coded_sub_block_flag[ xS ][ yS ] | ae(v) |
|     inferSbDcSigCoeffFlag = 1 | |
|   } | |
|   firstSigScanPosSb = numSbCoeff | |
|   lastSigScanPosSb = −1 | |
|   for( n = ( i = = lastSubBlock ) ? lastScanPos −1 : numSbCoeff − 1; n >= 0; n− − ) | |
| { | |
|     xC = ( xS << log2SbSize ) + DiagScanOrder[ log2SbSize ][ log2SbSize ][ n ][ 0 ] | |
|     yC = ( yS << log2SbSize ) + DiagScanOrder[ log2SbSize ][ log2SbSize ][ n ][ 1 ] | |
|     if( coded_sub_block_flag[ xS ][ yS ] && ( n > 0 || !inferSbDcSigCoeffFlag ) ) | |
| { | |
|       sig_coeff_flag[ xC ][ yC ] | ae(v) |
|     } | |
|     if( sig_coeff_flag[ xC ][ yC ] ) { | |
|       par_level_flag[ n ] | ae(v) |
|       rem_abs_gt1_flag[ n ] | ae(v) |
|       if( lastSigScanPosSb = = −1 ) | |
|         lastSigScanPosSb = n | |
|       firstSigScanPosSb = n | |
|     } | |
|     AbsLevelPass1[ xC ][ yC ] = | |
|         sig_coeff_flag[ xC ][ yC ] + par_level_flag[ n ] + 2 * rem_abs_gt1_flag[ n ] | |
|     if( dep_quant_enabled_flag ) | |
|       QState = QStateTransTable[ QState ][ par_level_flag[ n ] ] | |
|   } | |
|   for( n = numSbCoeff − 1; n >= 0; n− − ) { | |
|     if( rem_abs_gt1_flag[ n ] ) | |
|       rem_abs_gt2_flag[ n ] | ae(v) |
|   } | |
|   for( n = numSbCoeff − 1; n >= 0; n− − ) { | |
|     xC = ( xS << log2SbSize ) + DiagScanOrder[ log2SbSize ][ log2SbSize ][ n ][ 0 ] | |
|     yC = ( yS << log2SbSize ) + DiagScanOrder[ log2SbSize ][ log2SbSize ][ n ][ 1 ] | |
|     if( rem_abs_gt2_flag[ n ] ) | |
|       abs_remainder[ n ] | |
|     AbsLevel[ xC ][ yC ] = AbsLevelPass1[ xC ][ yC ] + | |
|             2 * ( rem_abs_gt2_flag[ n ] + abs_remainder[ n ] ) | |
|   } | |
|   if( dep_quant_enabled_flag || !sign_data_hiding_enabled_flag ) | |
|     signHidden = 0 | |
|   else | |
|     signHidden = ( lastSigScanPosSb − firstSigScanPosSb > 3 ? 1 : 0 ) | |
|   for( n = numSbCoeff − 1; n >= 0; n− − ) { | |
|     xC = ( xS << log2SbSize ) + DiagScanOrder[ log2SbSize ][ log2SbSize ][ n ][ 0 ] | |

TABLE 1-continued

| | Descriptor |
|---|---|
| ```
        yC = ( yS << log2SbSize ) + DiagScanOrder[ log2SbSize ][ log2SbSize ][ n ][ 1 ]
        if( sig_coeff_flag[ xC ][ yC ] &&
           ( !signHidden || ( n != firstSigScanPosSb ) ) )
           coeff_sign_flag[ n ]
      }
      if( dep_quant_enabled_flag ) {
         QState = startQStateSb
         for( n = numSbCoeff - 1; n >= 0; n- - ) {
            xC = ( xS << log2SbSize ) +
               DiagScanOrder[ log2SbSize ][ log2SbSize ][ n ][ 0 ]
            yC = ( yS << log2SbSize ) +
               DiagScanOrder[ log2SbSize ][ log2SbSize ][ n ][ 1 ]
            if( sig_coeff_flag[ xC ][ yC ] )
               TransCoeffLevel[ x0 ][ y0 ][ cIdx ][ xC ][ yC ] =
                  ( 2 * AbsLevel[ xC ][ yC ] - ( QState > 1 ? 1 : 0 ) ) *
                  ( 1 - 2 * coeff_sign_flag[ n ] )
            QState = QStateTransTable[ QState ][ par_level_flag[ n ] ]
         }
      } else {
         sumAbsLevel = 0
         for( n = numSbCoeff - 1; n >= 0; n- - ) {
            xC = ( xS << log2SbSize ) +
               DiagScanOrder[ log2SbSize ][ log2SbSize ][ n ][ 0 ]
            yC = ( yS << log2SbSize ) +
               DiagScanOrder[ log2SbSize ][ log2SbSize ][ n ][ 1 ]
            if( sig_coeff_flag[ xC ][ yC ] ) {
               TransCoeffLevel[ x0 ][ y0 ][ cIdx ][ xC ][ yC ] =
                  AbsLevel[ xC ][ yC ] * ( 1 - 2 * coeff_sign_flag[ n ] )
               if( signHidden ) {
                  sumAbsLevel += AbsLevel[ xC ][ yC ]
                  if( ( n = = firstSigScanPosSb ) && ( sumAbsLevel % 2 ) = = 1 ) )
                     TransCoeffLevel[ x0 ][ y0 ][ cIdx ][ xC ][ yC ] =
                        -TransCoeffLevel[ x0 ][ y0 ][ cIdx ][ xC ][ yC ]
               }
            }
         }
      }
   }
   if( cu_mts_flag[ x0 ][ y0 ] && ( cIdx = = 0 ) &&
      !transform_skip_flag[ x0 ][ y0 ][ cIdx ] &&
      ( ( CuPredMode[ x0 ][ y0 ] = = MODE_INTRA && numSigCoeff > 2 ) ||
        ( CuPredMode[ x0 ][ y0 ] = = MODE_INTER ) ) ) {
      mts_idx[ x0 ][ y0 ]
   }
}
``` | ae(v)<br><br><br><br><br><br><br><br><br><br><br><br><br><br><br><br><br><br><br><br><br><br><br><br><br><br><br><br><br><br><br><br><br><br><br><br><br>ae(v) | transform_skip_flag indicates whether or not a transform for an associated block is skipped. The associated block may be a coding block (CB) or a transform block (TB). In connection with the transform (and the quantization) and the residual coding process, the CB and the TB may be used interchangeably. For example, as described above, residual samples for the CB may be derived, and (quantized) transform coefficients may be derived through transform and quantization on the residual samples. And through the residual coding process, information (e.g., syntax elements) efficiently indicating positions, sizes, signs or the like of the (quantized) transform coefficients may be generated and signaled. The quantized transform coefficients may be simply called transform coefficients. Generally, in a case where the CB is not greater than a maximum TB, the size of the CB may be the same as that of the TB, and in this case, a target block to be transformed (and quantized) and residual-coded may be called the CB or the TB. Meanwhile, in a case where the CB is greater than the maximum TB, the target block to be transformed (and quantized) and residual-coded may be called the TB. While, hereinafter, syntax elements related to residual coding are described by way of example as being signaled in units of a transform blocks (TBs), the TB and the coding block (CB) may be used interchangeably as described above.

In one embodiment, based on the syntax elements last_sig_coeff_x_prefix, last_sig_coeff_y_prefix, last_sig_coef- f_x_suffix, and last_sig_coeff_y_suffix, the (x, y) position information of the last non-zero transform coefficient in the transform block may be encoded. More specifically, last_sig_coeff_x_prefix indicates a prefix of a column position of a last significant coefficient in a scanning order in a transform block; last_sig_coeff_y_prefix indicates a prefix of a row position of a last significant coefficient in the scanning order in the transform block; last_sig_coeff_x_suffix indicates a suffix of a column position of a last significant coefficient in the scanning order in the transform block; and last_sig_coeff_y_suffix indicates a suffix of a row position of a last significant coefficient in the scanning order in the transform block. Here, the significant coefficient may be the non-zero coefficient. The scanning order may be a right upward diagonal scanning order. Alternatively, the scanning order may be a horizontal scanning order, or a vertical scanning order. The scanning order may be determined based on whether or not the intra/inter prediction is applied to a target block (CB, or CB including TB), and/or a specific intra/inter prediction mode.

Next, after dividing a transform block into 4×4 sub-blocks, a one-bit syntax element for coded_sub_block_flag, may used for each 4×4 sub-block to indicate whether or not there is a non-zero coefficient in a current sub-block.

If the value of coded_sub_block_flag is 0, there is no more information to be transmitted, and therefore, the encoding process for the current sub-block may be terminated. Conversely, if the value of coded_sub_block_flag is 1, the encoding process for sig_coeff_flag may continue to be performed. Since the sub-block including the last non-zero coefficient does not require encoding of coded_sub_block_flag, and the sub-block including the DC information of the transform block has a high probability of including the non-zero coefficient, coded_sub_block_flag may be assumed to have a value of 1 without being encoded.

If it is determined that a non-zero coefficient exists in the current sub-block because the value of coded_sub_block_flag is 1, then, inversely, sig_coeff_flag having a binary value may be encoded according to the scan order. A 1-bit syntax element sig_coeff_flag may be encoded for each coefficient according to the scan order. If the value of the transform coefficient at the current scan position is not 0, the value of sig_coeff_flag may be 1. Here, in the case of a sub-block including the last non-zero coefficient, since sig_coeff_flag is not required to be encoded for the last non-zero coefficient, the encoding process for sig_coeff_flag may be omitted. Only when sig_coeff_flag is 1, level information encoding may be performed, and four syntax elements may be used in the level information encoding process. More specifically, each sig_coeff_flag[xC][yC] may indicate whether or not the level (value) of the corresponding transform coefficient at each transform coefficient position (xC, yC) in the current TB is non-zero. In an embodiment, the sig_coeff_flag may correspond to an example of a significant coefficient flag indicating whether or not a quantized transform coefficient is a non-zero effective coefficient.

The level value remaining after the encoding for sig_coeff_flag may be the same as in Equation 1 below. That is, the syntax element remAbsLevel indicating the level value to be encoded may be as shown in Equation 1 below. Here, coeff means an actual transform coefficient value.

$$\text{remAbsLevel} = |\text{coeff}| - 1 \quad \text{[Equation 1]}$$

Through par_level_flag, the least significant coefficient (LSB) value of remAbsLevel written in Equation 1 may be encoded as shown in Equation 2 below. Here, par_level_flag[n] may indicate a parity of a transform coefficient level (value) at a scanning position n. After par_leve_flag encoding, a transform coefficient level value remAbsLevel to be encoded may be updated as shown in Equation 3 below.

$$\text{par\_level\_flag} = \text{remAbsLevel} \ \& \ 1 \quad \text{[Equation 2]}$$

$$\text{remAbsLevel}' = \text{remAbsLevel} \gg 1 \quad \text{[Equation 3]}$$

rem_abs_gt1_flag may indicate whether or not remAbsLevel' at the corresponding scanning position n is greater than 1, and rem_abs_gt2_flag may indicate whether or not remAbsLevel' at the corresponding scanning position n is greater than 2. Encoding for abs_remainder may be performed only when rem_abs_gt2_flag is 1. When the relationship between the actual transform coefficient value coeff and each syntax element is summarized, it may be, for example, as in Equation 4 below, and Table 2 below shows examples related to Equation 4. In addition, the sign of each coefficient may be encoded using a 1-bit symbol coeff_sign_flag. |coeff| may indicate a transform coefficient level (value), and may be expressed as AbsLevel for a transform coefficient.

$$|\text{coeff}| = \text{sig\_coeff\_flag} + \text{par\_level\_flag} + 2*(\text{rem\_abs\_gt1\_flag} + \text{rem\_abs\_gt2\_flag} + \text{abs\_remainder}) \quad \text{[Equation 4]}$$

In an embodiment, the par_level_flag indicates an example of a parity level flag for parity of a transform coefficient level for the quantized transform coefficient, the rem_abs_gt1_flag indicates an example of a first transform coefficient level flag for whether or not the transform coefficient level is greater than a first threshold value, and the rem_abs_gt2_flag may indicate an example of a second transform coefficient level flag for whether or not the transform coefficient level is greater than a second threshold value.

In addition, in another embodiment, rem_abs_gt2_flag may be referred to as rem_abs_gt3_flag, and in another embodiment, rem_abs_gt1_flag and rem_abs_gt2_flag may be represented based on abs_level_gtx_flag[n][j]. abs_level_gtx_flag[n][j] may be a flag indicating whether or not the absolute value of the transform coefficient level at the scanning position n (or the transform coefficient level shifted by 1 to the right) is greater than $(j\ll 1)+1$. In one example, the rem_abs_gt1_flag may perform a function which is the same and/or similar function to abs_level_gtx_flag[n][0], and the rem_abs_gt2_flag may perform a function which is the same and/or similar to abs_level_gtx_flag[n][1]. That is, the abs_level_gtx_flag[n][0] may correspond to an example of the first transform coefficient level flag, and the abs_level_gtx_flag[n][1] may correspond to an example of the second transform coefficient level flag. The $(j\ll 1)+1$ may be replaced by a predetermined threshold value, such as a first threshold value and a second threshold value, according to circumstances.

TABLE 2

| [coeff] | sig_coeff_flag | par_level_flag | rem_abs_gt1_flag | rem_abs_gt2_flag | abs_remainder |
|---|---|---|---|---|---|
| 0 | 0 | | | | |
| 1 | 1 | 0 | 0 | | |
| 2 | 1 | 1 | 0 | | |
| 3 | 1 | 0 | 1 | 0 | |
| 4 | 1 | 1 | 1 | 0 | |
| 5 | 1 | 0 | 1 | 1 | 0 |
| 6 | 1 | 1 | 1 | 1 | 0 |
| 7 | 1 | 0 | 1 | 1 | 1 |
| 8 | 1 | 1 | 1 | 1 | 1 |
| 9 | 1 | 0 | 1 | 1 | 2 |
| 10 | 1 | 1 | 1 | 1 | 2 |
| 11 | 1 | 0 | 1 | 1 | 3 |
| ... | ... | ... | ... | ... | ... |

Figure 7:
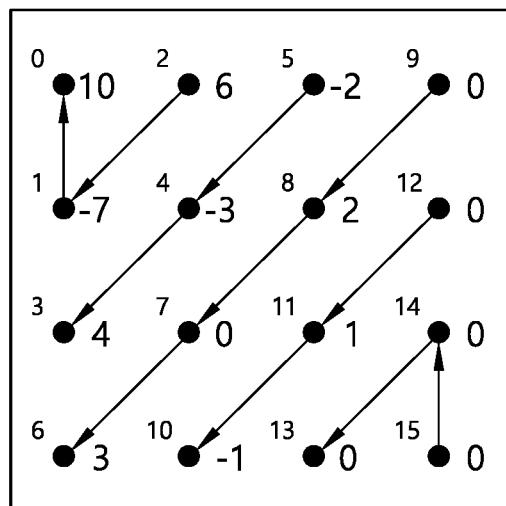
FIG. 7 is a diagram illustrating an example of transform coefficients in a 4×4 block.

FIG. 7 is a diagram illustrating an example of transform coefficients in a 4×4 block.

The 4×4 block of FIG. 7 shows an example of quantized coefficients. The block illustrated in FIG. 7 may be a 4×4 transform block, or a 4×4 sub-block of an 8×8, 16×16, 32×32, or 64×64 transform block. The 4×4 block of FIG. 7 may be a luminance block or a chrominance block. The encoding result for the inverse diagonally scanned coefficients of FIG. 7 may be, for example, shown in Table 3. In Table 3, scan_pos indicates the position of the coefficient according to the inverse diagonal scan. scan_pos 15 is a coefficient which is scanned first in the 4×4 block, that is, a coefficient at a bottom-right corner, and scan_pos 0 is a coefficient which is scanned last, that is, a coefficient at a top-left corner. Meanwhile, in one embodiment, the scan_pos may be referred to as a scan position. For example, the scan_pos 0 may be referred to as scan position 0.

TABLE 3

| scan_pos | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| coefficients | 0 | 0 | 0 | 0 | 1 | −1 | 0 | 2 | 0 | 3 | −2 | −3 | 4 | 6 | −7 | 10 |
| sig_coeff_flag | 0 | 0 | 0 | 0 | 1 | 1 | 0 | 1 | 0 | 1 | 1 | 1 | 1 | 1 | 1 | 1 |
| par_level_flag | | | | | 0 | 0 | | 1 | | 0 | 1 | 0 | 1 | 1 | 0 | 1 |
| rem_abs_gt1_flag | | | | | 0 | 0 | | 0 | | 1 | 0 | 1 | 1 | 1 | 1 | 1 |
| rem_abs_gt2_flag | | | | | | | | | | 0 | | 0 | 0 | 1 | 1 | 1 |
| abs_remainder | | | | | | | | | | | | | | 0 | 1 | 2 |
| ceoff_sign_flag | | | | | 0 | 1 | | 0 | | 0 | 1 | 1 | 0 | 0 | 1 | 0 |

Meanwhile, as described with reference to Table 1, prior to encoding the residual signal and the special residual signal, whether or not to apply the transform of the corresponding block is first transmitted. By expressing the correlation between the residual signals in the transform domain, compaction of data is achieved and transmitted to the decoding apparatus. If the correlation between the residual signals is insufficient, data compaction may not occur sufficiently. In this case, a conversion process including a complex calculation process may be omitted, and a residual signal in the pixel domain (spatial domain) may be transferred to the decoding apparatus.

Since the residual signal of the pixel domain that has not been subjected to transform has different characteristics (the distribution of the residual signal, the absolute level of each residual signal, etc.) from the residual signal of the general transformation domain, a residual signal encoding method for efficiently transmitting such a signal to a decoding apparatus according to an example of the present disclosure will be proposed hereinafter.

Figure 8:
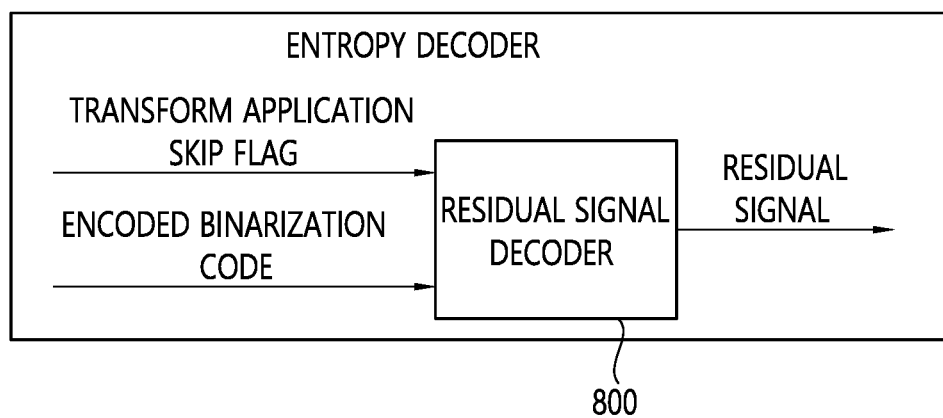
FIG. 8 is a diagram illustrating a residual signal decoder according to an example of the present disclosure.

FIG. 8 is a diagram illustrating a residual signal decoder according to an example of the present disclosure.

As illustrated, a transformation application flag indicating whether or not a transform is applied to a corresponding transform block and information on the encoded binarization code may be input to the residual signal decoder 800, and a decoded residual signal may be output from the residual signal decoder 800.

A flag for whether or not to apply a transform may be expressed as transform_skip_flag, and the encoded binarization code may be input to the residual signal decoder 800 through the binarization process through FIG. 6.

The transform skip flag is transmitted in units of transform blocks, and in Table 1 the flag for whether or not to transform is limited to a specific block size (a condition of parsing the transform skip flag is included only when the transform block size is 4×4 or less). However, in the present embodiment, the size of a block for determining whether or not to parse the transform skip flag may be variously configured. The sizes of Log 2TbWidth and log 2TbHeight are determined as variables wN and hN, and the wN and the hN may be selected as one of the following.

$$wN = \{2,3,4,5\}$$
$$wH = \{2,3,4,5\} \quad \text{[Equation 5]}$$

A syntax element to which Equation 5 may be applied is as follows.

TABLE 4

| if( transform_skip_enabled_flag && <br> ( cIdx != 0 \|\| cu_mts_flag[ x0 ][ y0 ] == 0 ) && <br>   ( log2TbWidth <= wN ) && ( log2TbHeight <= hN ) ) <br>    transform_skip_flag[ x0 ][ y0 ][ cIdx ] | ae(v) |
|---|---|

As described above, a method of decoding the residual signal may be determined according to the transform skip flag. Through the proposed method, it is possible to reduce the complexity in the entropy decoding process and improve the encoding efficiency by efficiently processing signals having different statistical characteristics from each other.

Based on the description in Table 1 and the above embodiment, in this embodiment, when the current decoding target block is residuals of the untransformed pixel domain, a method of decoding a residual signal encoded in a 4×4 sub-block unit in units of transform blocks (TBs) is proposed.

The general residual signal is expressed as a transform domain, and as the transformed residual signal gets closer to the top-left based on the block's coefficient, a non-zero coefficient is more likely to occur, and the absolute value level of the coefficient may also have a greater value. The encoding may be performed by the above-described method, reflecting these characteristics.

However, the residual of the pixel domain that is not expressed in the transform domain does not have the above characteristics, and the probability of generating a coefficient of zero or more has randomness. In this case, the method of determining an element to be encoded as coded_sub_block_flag, in a unit higher than the pixel unit by expressing the residual in units of sub-blocks may rather cause a side effect of redundantly transmitting information on the coefficient distribution, that is, an increase in complexity. Accordingly, according to the present embodiment, for a transform block to which a transform is not applied, encoding and decoding efficiency may be improved by transmitting a residual signal in a transform block unit instead of a sub-block unit.

Figure 9:
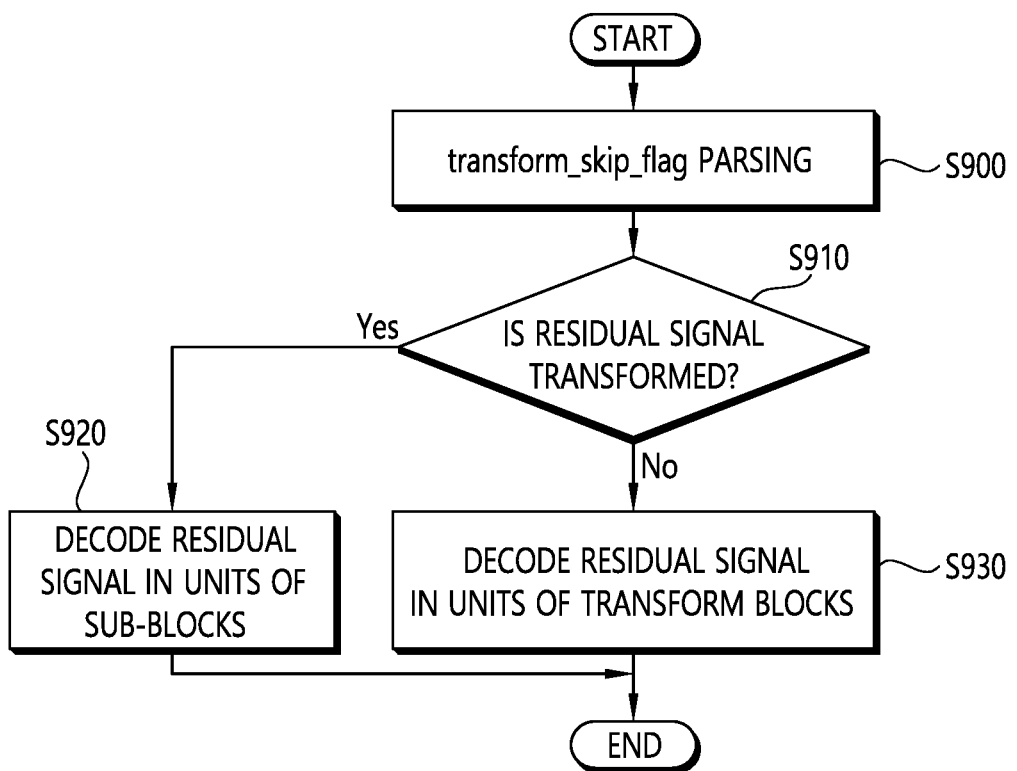
FIG. 9 is a control flowchart illustrating a method of decoding a residual signal according to an exemplary embodiment of the present disclosure.

This is summarized with reference to FIG. 9 as follows. FIG. 9 is a control flowchart illustrating a method of decoding a residual signal according to an exemplary embodiment of the present disclosure.

First, the entropy decoder or the residual signal decoder of the decoding apparatus parses a transform skip flag (transform_skip_flag) indicating whether or not a transform process has been performed on a transform block (S900), and it may be determined based on the parsed information whether a residual signal has been transformed (S910).

As a result of the determination, when the transform skip flag indicates that the residual signal has been transformed, the entropy decoder or the residual signal decoder may decode the transformed block in units of sub-blocks (S920).

Contrarily, when the transform skip flag indicates that the residual signal has not been transformed, the entropy decoder or the residual signal decoder may decode the transform block in units of transform blocks rather than in units of sub-blocks (S930).

Meanwhile, based on the technique of decoding the residual based on Table 1 and the transform skip flag, the present embodiment proposes a method of determining a context element, that is, a syntax, when the current decoding target block is a residual of an untransformed pixel domain.

In the case of a general transform domain residual, the residual signal is expressed as a level value for each frequency component, and in the high frequency region, the probability of being expressed as zero or a number close to zero by quantization increases. Therefore, in Table 1, a method was used in which the subsequent context element parsing may be omitted by first encoding sig_coeff_flag, which is a context element for whether or not the current transform coefficient value is 0.

When sig_coeff_flag is not 0, rem_abs_gt1_flag, par_level_flag, rem_abs_gt2_flag, and the like may be sequentially encoded according to the value of the current transform coefficient. However, in the case of a residual signal of a pixel domain that has not been subjected to the transform, the absolute level value of the signal has randomness.

The context-encoded syntax element may include at least one of the sig_coeff_flag, par_level_flag, rem_abs_gt1_flag, and/or rem_abs_gt2_flag as a syntax element that is encoded through arithmetic coding based on context. In addition, hereinafter, the context encoding bin may indicate a context-encoded bin for at least one of said sig_coeff_flag, par_level_flag, rem_abs_gt1_flag, and/or rem_abs_gt2_flag.

In general, in a case where the value of the residual signal is large, when all of the syntax elements, such as sig_coeff_flag, par_level_flag, rem_abs_gt1_flag, and rem_abs_gt2_flag, are expressed in all coefficients, redundant information is more likely to be transmitted compared to transmitting the level value by binarizing it as it is. Accordingly, the present embodiment proposes a method of improving encoding efficiency by omitting some context elements for the residual signal of the pixel domain.

The proposed method may be branched based on the transform_skip_flag context element in Table 1, and, the existing method that does not correspond to the branch statement may follow, for example, the context element (sig_coeff_flag, par_level_flag, rem_abs_gt1_flag, rem_abs_gt2_flag, abs_remainder, coeff_sign_flag) of Table 1, or may be encoded and decoded including the context element defined above. That is, when the transform is applied, context elements of sig_coeff_flag, par_level_flag, rem_abs_gt1_flag, rem_abs_gt2_flag, abs_remainder, and coeff_sign_flag may be encoded and decoded as shown in Table 1.

Meanwhile, the residual signal to which the transforma is not applied may be encoded and decoded through context elements of sig_coeff_flag, par_level_flag, rem_abs_gt1_flag, abs_remainder, and coeff_sign_flag.

Table 5 shows the context elements according to the present embodiment.

TABLE 5

|  | Descriptor |
|---|---|
| residual_coding( x0, y0, log2TbWidth, log2TbHeight, cIdx ) { | |
|   if( transform_skip_enabled_flag && | |
|   ( cIdx != 0 \|\| cu_mts_flag[ x0 ][ y0 ] = = 0 ) && | |
|     ( log2TbWidth <= wN ) && ( log2TbHeight <= hN ) ) | |
|     transform_skip_flag[ x0 ][ y0 ][ cIdx ] | ae(v) |
|   ... | |
|   if ( transform_skip_flag[x0][y0][cIdx] ) | |
|   { | |
|     for( n = ( i = = lastSubBlock ) ? lastScanPos − 1 : numSbCoeff − 1; n >= 0; n− − ) { | |
|       xC = ( xS << log2SbSize ) + DiagScanOrder[ log2SbSize ][ log2SbSize ][ n ][ 0 ] | |
|       yC = ( yS << log2SbSize ) + DiagScanOrder[ log2SbSize ][ log2SbSize ][ n ][ 1 ] | |
|       if( coded_sub_block_flag[ xS ][ yS ] && ( n > 0 \|\| !inferSbDcSigCoeffFlag ) ) { | |
|         sig_coeff_flag[ xC ][ yC ] | ae(v) |
|       } | |
|       if( sig_coeff_flag[ xC ][ yC ] ) { | |
|         par_level_flag[ n ] | ae(v) |
|         rem_abs_gt1_flag[ n ] | ae(v) |
|         if( lastSigScanPosSb = = −1 ) | |
|           lastSigScanPosSb = n | |
|         firstSigScanPosSb = n | |
|       } | |
|       AbsLevelPass1[ xC ][ yC ] = | |
|         sig_coeff_flag[ xC ][ yC ] + par_level_flag[ n ] + 2 * rem_abs_gt1_flag[ n ] | |
|       if( dep_quant_enabled_flag ) | |
|         QState = QStateTransTable[ QState ][ par_level_flag[ n ] ] | |
|     } | |
|     for( n = numSbCoeff − 1; n >= 0; n− − ) { | |
|       xC = ( xS << log2SbSize ) + DiagScanOrder[ log2SbSize ][ log2SbSize ][ n ][ 0 ] | |
|       yC = ( yS << log2SbSize ) + DiagScanOrder[ log2SbSize ][ log2SbSize ][ n ][ 1 ] | |
|       if( rem_abs_gt1_flag[ n ] ) | |
|         abs_remainder[ n ] | |

TABLE 5-continued

Descriptor

```
            AbsLevel[ xC ][ yC ] = AbsLevelPass1[ xC ][ yC ] +
                    2 * ( abs_remainder[ n ] )
        }
        if( dep_quant_enabled_flag || !sign_data_hiding_enabled_flag )
            signHidden = 0
        else
            signHidden = ( lastSigScanPosSb − firstSigScanPosSb > 3 ? 1 : 0 )
        for( n = numSbCoeff − 1; n >= 0; n− − ) {
            xC = ( xS << log2SbSize ) +
DiagScanOrder[ log2SbSize ][ log2SbSize ][ n ][ 0 ]
            yC = ( yS << log2SbSize ) +
DiagScanOrder[ log2SbSize ][ log2SbSize ][ n ][ 1 ]
            if( sig_coeff_flag[ xC ][ yC ] &&
                ( !signHidden || ( n != firstSigScanPosSb ) ) )
                coeff_sign_flag[ n ]                                         ae(v)
        }
        if( dep_quant_enabled_flag ) {
            QState = startQStateSb
            for( n = numSbCoeff − 1; n >= 0; n− − ) {
                xC = ( xS << log2SbSize ) +
                    DiagScanOrder[ log2SbSize ][ log2SbSize ][ n ][ 0 ]
                yC = ( yS << log2SbSize ) +
                    DiagScanOrder[ log2SbSize ][ log2SbSize ][ n ][ 1 ]
                if( sig_coeff_flag[ xC ][ yC ] )
                    TransCoeffLevel[ x0 ][ y0 ][ cIdx ][ xC ][ yC ] =
                        ( 2 * AbsLevel[ xC ][ yC ] − ( QState > 1 ? 1 : 0 ) ) *
                        ( 1 − 2 * coeff_sign_flag[ n ] )
                QState = QStateTransTable[ QState ][ par_level_flag[ n ] ]
        } else {
            sumAbsLevel = 0
            for( n = numSbCoeff − 1; n >= 0; n− − ) {
                xC = ( xS << log2SbSize ) +
                    DiagScanOrder[ log2SbSize ][ log2SbSize ][ n ][ 0 ]
                yC = ( yS << log2SbSize ) +
                    DiagScanOrder[ log2SbSize ][ log2SbSize ][ n ][ 1 ]
                if( sig_coeff_flag[ xC ][ yC ] ) {
                    TransCoeffLevel[ x0 ][ y0 ][ cIdx ][ xC ][ yC ] =
                        AbsLevel[ xC ][ yC ] * ( 1 − 2 * coeff_sign_flag[ n ] )
                    if( signHidden ) {
                        sumAbsLevel += AbsLevel[ xC][ yC ]
                        if ( ( n = = firstSigScanPosSb ) && ( sumAbsLevel % 2 ) = =
1 ) )
                            TransCoeffLevel[ x0 ][ y0 ][ cIdx ][ xC ][ yC ] =
                                −TransCoeffLevel[ x0 ][ y0 ][ cIdx ][ xC ][ yC ]
                    }
                }
            }
        }
    }
}
else { //transform_skip_flag
    ...
}
if( cu_mts_flag[ x0 ][ y0 ] && ( cIdx = = 0 ) &&
    !transform_skip_flag[ x0 ][ y0 ][ cIdx ] &&
    ( ( CuPredMode [ x0 ][ y0 ] = = MODE_INTRA && numSigCoeff > 2 ) ||
        ( CuPredMode[ x0 ][ y0 ] = = MODE_INTER ) ) ) {
    mts_idx[ x0 ][ y0 ]                                                      ae(v)
}
```

Figure 10:
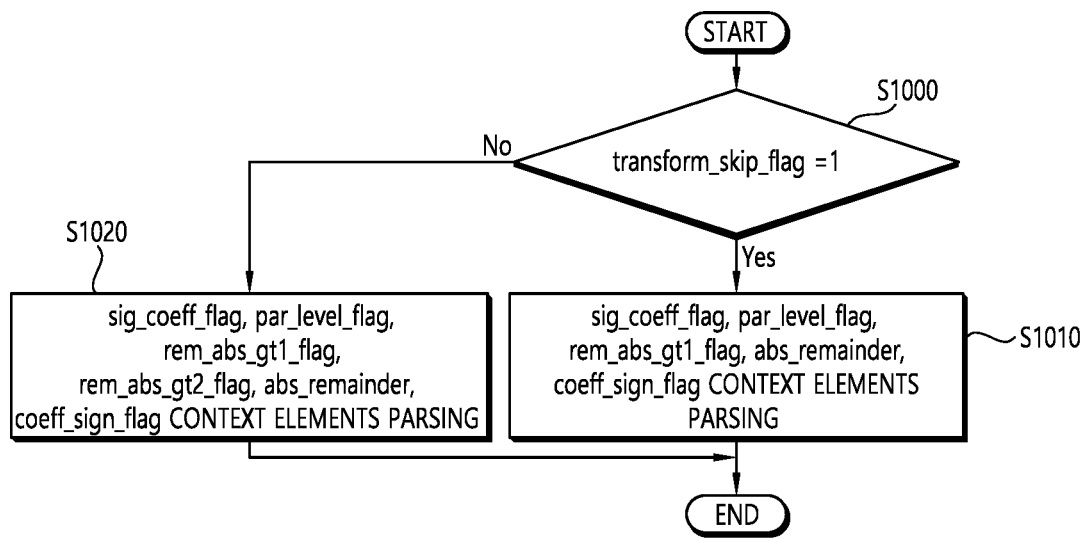
FIG. 10 is a control flowchart illustrating a method of parsing a context element according to an embodiment of the present disclosure.

FIG. 10 is a control flowchart illustrating a process of parsing a context element according to the present embodiment. The context element parsing according to the transform skip flag according to FIG. 10 will be described as follows.

First, a transform skip flag (transform_skip_flag) indicating whether a transform process has been performed on a transform block is parsed to determine whether or not transform_skip_flag is 1 (S1000).

As a result of the determination, in the case of the residual value whose transform_skip_flag is 1, that is, for which the transform has been skipped without being applied, the context elements of sig_coeff_flag, par_level_flag, rem_abs_gt1_flag, abs_remainder, and coeff_sign_flag may be encoded, and the context elements of sig_coeff_flag, par_level_flag, rem_abs_gt1_flag, abs_remainder, and coeff_sign_flag may be parsed (S1010).

In this case, the context elements may be sequentially parsed or the parsing order may be changed.

Contrarily, in the case of the residual value whose transform_skip_flag is 0, that is, to which the transform has been applied, the context elements of sig_coeff_flag, par_level_flag, rem_abs_gt1_flag, rem_abs_gt2_flag, abs_remainder, and coeff_sign_flag may be encoded, and the context elements of sig_coeff_flag, par_level_flag, rem_abs_gt1_flag, rem_abs_gt2_flag, abs_remainder, and coeff_sign_flag may be parsed (S1020). In this case, the context elements may be sequentially parsed or the parsing order may be changed.

That is, in the case of the residual value to which the transform is not applied, rem_abs_gt2_flag is not encoded and decoded, when compared with the residual value to which the transform is applied. In a case where the residual value is large, when all of the syntax elements, such as sig_coeff_flag, par_level_flag, rem_abs_gt1_flag and rem_abs_gt2_flag, are expressed in all coefficients, redundant information is more likely to be transmitted compared to transmitting the level value by binarizing it as it is, and thus, in the present embodiment, encoding efficiency is improved by omitting the context element of rem_abs_gt2_flag.

Meanwhile, based on the technique of decoding the residual based on Table 1 and the transform skip flag, another embodiment according to the present disclosure proposes a method of determining a context element, that is, a syntax, when the current decoding target block is a residual of an untransformed pixel domain.

In the case of a general transform domain residual, the residual signal is expressed as a level value for each frequency component, and in the high frequency region, the probability of being expressed as zero or a number close to zero by quantization increases. Therefore, in Table 1, a method was used in which the subsequent context element parsing may be omitted by first encoding sig_coeff_flag, which is a context element for whether or not the current transform coefficient value is 0.

When sig_coeff_flag is not 0, rem_abs_gt1_flag, par_level_flag, rem_abs_gt2_flag, and the like may be sequentially encoded according to the value of the current transform coefficient. However, in the case of a residual signal of a pixel domain that has not been subjected to the transform, the absolute level value of the signal has randomness.

The context-encoded syntax element may include at least one of the sig_coeff_flag, par_level_flag, rem_abs_gt1_flag, and/or rem_abs_gt2_flag as a syntax element that is encoded through arithmetic coding based on context. In addition, hereinafter, the context encoding bin may indicate a context-encoded bin for at least one of said sig_coeff_flag, par_level_flag, rem_abs_gt1_flag, and/or rem_abs_gt2_flag.

In general, in a case where the value of the residual signal is large, when all of the syntax elements, such as sig_coeff_flag, par_level_flag, rem_abs_gt1_flag, and rem_abs_gt2_flag, are expressed in all coefficients, redundant information is more likely to be transmitted compared to transmitting the level value by binarizing it as it is. Accordingly, the present embodiment proposes a method of improving encoding efficiency by omitting some context elements for the residual signal of the pixel domain.

The proposed method may be branched based on the transform_skip_flag context element in Table 1, and, the existing method that does not correspond to the branch statement may follow, for example, the context element (sig_coeff_flag, par_level_flag, rem_abs_gt1_flag, rem_abs_gt2_flag, abs_remainder, coeff_sign_flag) of Table 1, or may be encoded and decoded including the context element defined above. That is, when the transform is applied, context elements of sig_coeff_flag, par_level_flag, rem_abs_gt1_flag, rem_abs_gt2_flag, abs_remainder, and coeff_sign_flag may be encoded and decoded as shown in Table 1.

Meanwhile, the residual signal to which the transforma has not been applied may be encoded and decoded through context elements of sig_coeff_flag, par_level_flag, abs_remainder, and coeff_sign_flag.

Table 6 shows the context elements according to the present embodiment.

TABLE 6

| | Descriptor |
|---|---|
| residual_coding( x0, y0, log2TbWidth, log2TbHeight, cIdx ) { <br>   if( transform_skip_enabled_flag && <br>   ( cIdx != 0 \|\| cu_mts_flag[ x0 ][ y0 ] = = 0 ) && <br>     ( log2TbWidth <= wN ) && ( log2TbHeight <= hN ) ) <br>     transform_skip_flag[ x0 ][ y0 ][ cIdx ] <br> ... <br>   if ( transform_skip_flag[x0][y0][cIdx] ) <br>   { <br>     for( n = ( i = = lastSubBlock ) ? lastScanPos − 1 : numSbCoeff − 1; n >= 0; n− − ) { <br>       xC = ( xS << log2SbSize ) + DiagScanOrder[ log2SbSize ][ log2SbSize ][ n ][ 0 ] <br>       yC = ( yS << log2SbSize ) + DiagScanOrder[ log2SbSize ][ log2SbSize ][ n ][ 1 ] <br>       if( coded_sub_block_flag[ xS ][ yS ] && ( n > 0 \|\| !inferSbDcSigCoeffFlag ) ) { <br>         sig_coeff_flag[ xC ][ yC ] <br>       } <br>       if( sig_coeff_flag[ xC ][ yC ] ) { <br>         par_level_flag[ n ] <br>         if( lastSigScanPosSb = = −1 ) <br>           lastSigScanPosSb = n <br>         firstSigScanPosSb = n <br>       } <br>       AbsLevelPass1[ xC ][ yC ] = <br>         sig_coeff_flag[ xC][ yC ] + par_level_flag[ n ] <br>       if( dep_quant_enabled_flag ) <br>         QState = QStateTransTable[ QState ][ par_level_flag[ n ] ] <br>     } <br>     for( n = numSbCoeff − 1; n >= 0; n− − ) { <br>       xC = ( xS << log2SbSize ) + DiagScanOrder[ log2SbSize ][ log2SbSize ][ n ][ 0 ] <br>       yC = ( yS << log2SbSize ) + DiagScanOrder[ log2SbSize ][ log2SbSize ][ n ][ 1 ] <br>       if( sig_coeff_flag[ n ] ) | ae(v) <br><br><br><br><br><br><br><br><br><br><br><br> ae(v) <br><br> ae(v) |

TABLE 6-continued

| | Descriptor |
|---|---|
| ```
                    abs_remainder[ n ]
                  AbsLevel[ xC ][ yC ] = AbsLevelPass1[ xC ][ yC ] +
                          2 * ( abs_remainder[ n ] )
                }
              if( dep_quant_enabled_flag || !sign_data_hiding_enabled_flag )
                signHidden = 0
              else
                signHidden = ( lastSigScanPosSb − firstSigScanPosSb > 3 ? 1 : 0 )
              for( n = numSbCoeff − 1; n >= 0; n− − ) {
                xC = ( xS << log2SbSize ) +
          DiagScanOrder[ log2SbSize ][ log2SbSize ][ n ][ 0 ]
                yC = ( yS << log2SbSize ) +
          DiagScanOrder[ log2SbSize ][ log2SbSize ][ n ][ 1 ]
                   if( sig_coeff_flag[ xC ][ yC ] &&
                       ( !signHidden || ( n != firstSigScanPosSb ) ) )
                     coeff_sign_flag[ n ]
              }
              if( dep_quant_enabled_flag ) {
                QState = startQStateSb
                for( n = numSbCoeff − 1; n >= 0; n− − ) {
                  xC = ( xS << log2SbSize ) +
                      DiagScanOrder[ log2SbSize ][ log2SbSize ][ n ][ 0 ]
                  yC = ( yS << log2SbSize ) +
                      DiagScanOrder[ log2SbSize ][ log2SbSize ][ n ][ 1 ]
                  if( sig_coeff_flag[ xC ][ yC ] )
                    TransCoeffLevel[ x0 ][ y0 ][ cIdx ][ xC ][ yC ] =
                        ( 2 * AbsLevel[ xC ][ yC ] − ( QState > 1 ? 1 : 0 ) ) *
                        ( 1 − 2 * coeff_sign_flag[ n ] )
                  QState = QStateTransTable[ QState ][ par_level_flag[ n ] ]
              } else {
                sumAbsLevel = 0
                for( n = numSbCoeff − 1; n >= 0; n− − ) {
                  xC = ( xS << log2SbSize ) +
                      DiagScanOrder[ log2SbSize ][ log2SbSize ][ n ][ 0 ]
                  yC = ( yS << log2SbSize ) +
                      DiagScanOrder[ log2SbSize ][ log2SbSize ][ n ][ 1 ]
                  if( sig_coeff_flag[ xC ][ yC ] ) {
                    TransCoeffLevel[ x0 ][ y0 ][ cIdx ][ xC ][ yC ] =
                        AbsLevel[ xC ][ yC ] * ( 1 − 2 * coeff_sign_flag[ n ] )
                    if( signHidden ) {
                      sumAbsLevel += AbsLevel[ xC ][ yC ]
                      if( ( n = = firstSigScanPosSb ) && ( sumAbsLevel % 2 ) = =
  1 ) )
                        TransCoeffLevel[ x0 ][ y0 ][ cIdx ][ xC ][ yC ] =
                            −TransCoeffLevel[ x0 ][ y0 ][ cIdx ][ xC ][ yC ]
                    }
                  }
                }
              }
            }
          }
        else {
        }
        if( cu_mts_flag[ x0 ][ y0 ] && ( cIdx = = 0 ) &&
          !transform_skip_flag[ x0 ][ y0 ][ cIdx ] &&
          ( ( CuPredMode[ x0 ][ y0 ] = = MODE_INTRA && numSigCoeff > 2 ) ||
            ( CuPredMode[ x0 ][ y0 ] = = MODE_INTER ) ) ) {
          mts_idx[ x0 ][ y0 ]
}
``` | <br><br><br><br><br><br><br><br><br><br><br><br><br><br>ae(v)<br><br><br><br><br><br><br><br><br><br><br><br><br><br><br><br><br><br><br><br><br><br><br><br><br><br><br><br><br><br><br><br><br><br><br><br>ae(v) |

Figure 11:
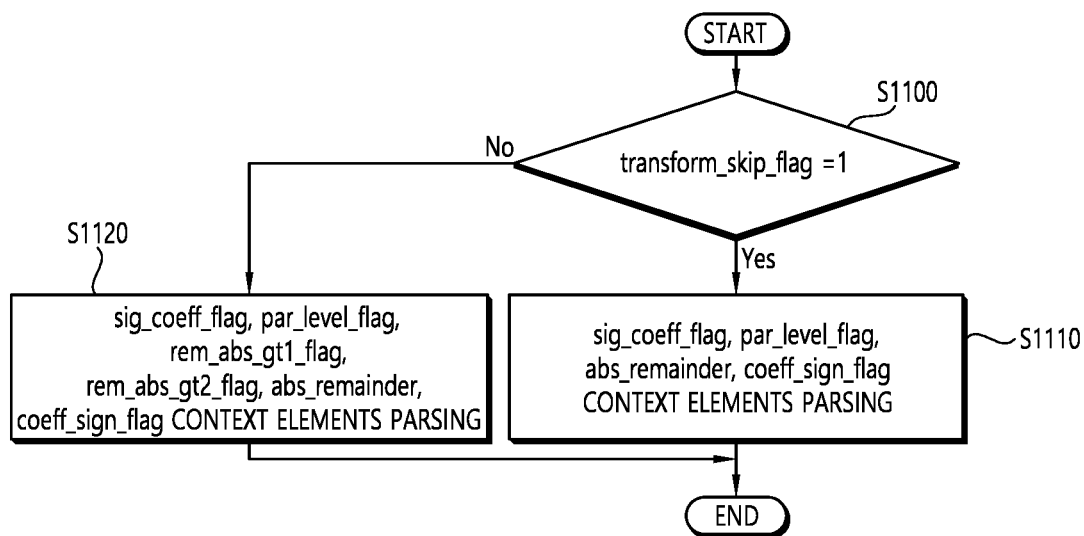
FIG. 11 is a control flowchart illustrating a method of parsing a context element according to another embodiment of the present disclosure.

FIG. 11 is a control flowchart illustrating a process of parsing a context element according to the present embodiment. The context element parsing according to the transform skip flag according to FIG. 11 will be described as follows.

First, a transform skip flag (transform_skip_flag) indicating whether a transform process has been performed on a transform block is parsed to determine whether or not transform_skip_flag is 1 (S1100).

As a result of the determination, in the case of the residual value whose transform_skip_flag is 1, that is, for which the transform has been skipped without being applied, the context elements of sig_coeff_flag, par_level_flag, abs_remainder, and coeff_sign_flag may be encoded, and the context elements of sig_coeff_flag, par_level_flag, abs_remainder, and coeff_sign_flag may be parsed (S1110). In this case, the context elements may be sequentially parsed or the parsing order may be changed.

Contrarily, in the case of the residual value whose transform_skip_flag is 0, that is, to which the transform has been applied, the context elements of sig_coeff_flag, par_level_flag, rem_abs_gt1_flag, rem_abs_gt2_flag, abs_remainder, and coeff_sign_flag may be encoded, and the context elements of sig_coeff_flag, par_level_flag, rem_abs_gt1_flag, rem_abs_gt2_flag, abs_remainder, and coeff_sign_flag may be parsed (S1120). In this case, the context elements may be sequentially parsed or the parsing order may be changed.

That is, in the case of the residual value to which the transform has not been applied, rem_abs_gt1_flag and rem_abs_gt2_flag are not encoded and decoded, when compared with the residual value to which the transform has been applied. In a case where the residual value is large, when all of the syntax elements, such as sig_coeff_flag, par_level_flag, rem_abs_gt1_flag and rem_abs_gt2_flag, are expressed in all coefficients, redundant information is more likely to be transmitted compared to transmitting the level value by binarizing it as it is, and thus, in the present embodiment, encoding efficiency is improved by omitting the context elements of rem_abs_gt1_flag and rem_abs_gt2_flag.

Meanwhile, based on the technique of decoding the residual based on Table 1 and the transform skip flag, still another embodiment according to the present disclosure proposes a method of determining a context element when the current decoding target block is a residual of an untransformed pixel domain.

In the case of a general transform domain residual, the residual signal is expressed as a level value for each frequency component, and in the high frequency region, the probability of being expressed as zero or a number close to zero by quantization increases. Therefore, in Table 1, a method was used in which the subsequent context element parsing may be omitted by first encoding sig_coeff_flag, which is a context element for whether or not the current transform coefficient value is 0.

When sig_coeff_flag is not 0, rem_abs_gt1_flag, par_level_flag, rem_abs_gt2_flag, and the like may be sequentially encoded according to the value of the current transform coefficient. However, in the case of a residual signal of a pixel domain that has not been subjected to the transform, the absolute level value of the signal has randomness.

The context-encoded syntax element may include at least one of the sig_coeff_flag, par_level_flag, rem_abs_gt1_flag, and/or rem_abs_gt2_flag as a syntax element that is encoded through arithmetic coding based on context. In addition, hereinafter, the context encoding bin may indicate a context-encoded bin for at least one of said sig_coeff_flag, par_level_flag, rem_abs_gt1_flag, and/or rem_abs_gt2_flag.

In general, in a case where the value of the residual signal is large, when all of the syntax elements, such as sig_coeff_flag, par_level_flag, rem_abs_gt1_flag, and rem_abs_gt2_flag, are expressed in all coefficients, redundant information is more likely to be transmitted compared to transmitting the level value by binarizing it as it is. Accordingly, the present embodiment proposes a method of improving encoding efficiency by omitting some context elements for the residual signal of the pixel domain.

The proposed method may be branched based on the transform_skip_flag context element in Table 1, and, the existing method that does not correspond to the branch statement may follow, for example, the context element (sig_coeff_flag, par_level_flag, rem_abs_gt1_flag, rem_abs_gt2_flag, abs_remainder, coeff_sign_flag) of Table 1, or may be encoded and decoded including the context element defined above. That is, when the transform is applied, context elements of sig_coeff_flag, par_level_flag, rem_abs_gt1_flag, rem_abs_gt2_flag, abs_remainder, and coeff_sign_flag may be encoded and decoded as shown in Table 1.

Meanwhile, the residual signal to which the transforma has not been applied may be encoded and decoded through context elements of sig_coeff_flag, abs_remainder, and coeff_sign_flag.

In addition, according to an example, when all the number of bin for the context encoding syntax element has been used, only abs_remainder and coeff_sign_flag may be coded or decoded/parsed without coding or decoding/parsing the context encoding syntax element any more.

Table 7 shows the context elements according to the present embodiment.

TABLE 7

| | Descriptor |
|---|---|
| residual_coding( x0, y0, log2TbWidth, log2TbHeight, cIdx ) { <br>  if( transform_skip_enabled_flag && <br>  ( cIdx ! = 0 \|\| cu_mts_flag[ x0 ][ y0 ] = = 0 ) && <br>    ( log2TbWidth <= wN ) && ( log2TbHeight <= hN ) ) <br>    transform_skip_flag[ x0 ][ y0 ][ cIdx ] <br>... <br>  if ( transform_skip_flag[x0][y0][cIdx] ) <br>  { <br>    for( n = ( i = = lastSubBlock ) ? lastScanPos − 1 : numSbCoeff − 1; n >= 0; n− − ) { <br>      xC = ( xS << log2SbSize ) + DiagScanOrder[ log2SbSize ][ log2SbSize ][ n ][ 0 ] <br>      yC = ( yS << log2SbSize ) + DiagScanOrder[ log2SbSize ][ log2SbSize ][ n ][ 1 ] <br>      if( coded_sub_block_flag[ xS ][ yS ] && ( n > 0 \|\| !inferSbDcSigCoeffFlag ) ) { <br>        sig_coeff_flag[ xC ][ yC ] <br>      } <br>      if( sig_coeff_flag[ xC ][ yC ] ) { <br>        if( lastSigScanPosSb = = −1 ) <br>          lastSigScanPosSb = n <br>        firstSigScanPosSb = n <br>      } <br>      AbsLevelPass1[ xC ][ yC ] = sig_coeff_flag[ xC ][ yC ] <br>  for( n = numSbCoeff − 1; n >= 0; n− − ) { <br>    xC = ( xS << log2SbSize ) + DiagScanOrder[ log2SbSize ][ log2SbSize ][ n ][ 0 ] <br>    yC = ( yS << log2SbSize ) + DiagScanOrder[ log2SbSize ][ log2SbSize ][ n ][ 1 ] <br>      abs_remainder[ n ] | ae(v) <br><br> ae(v) <br><br><br><br><br> ae(v) |

TABLE 7-continued

Descriptor

```
            AbsLevel[ xC ][ yC ] = AbsLevelPass1[ xC ][ yC ] +
                    abs_remainder[ n ]
        }
        if(!sign_data_hiding_enabled_flag )
            signHidden = 0
        else
            signHidden = ( lastSigScanPosSb - firstSigScanPosSb > 3 ? 1 : 0 )
        for( n = numSbCoeff - 1; n >= 0; n- - ) {
            xC = ( xS << log2SbSize ) +
DiagScanOrder[ log2SbSize ][ log2SbSize ][ n ][ 0 ]
            yC = ( yS << log2SbSize ) +
DiagScanOrder[ log2SbSize ][ log2SbSize ][ n ][ 1 ]
            if( sig_coeff_flag[ xC ][ yC ] &&
                ( !signHidden || ( n != firstSigScanPosSb ) ) )
                coeff_sign_flag[ n ]                                            ae(v)
        }
        sumAbsLevel = 0
        for( n = numSbCoeff - 1; n >= 0; n- - ) {
            xC = ( xS << log2SbSize ) +
                DiagScanOrder[ log2SbSize ][ log2SbSize ][ n ][ 0 ]
            yC = ( yS << log2SbSize ) +
                DiagScanOrder[ log2SbSize ][ log2SbSize ][ n ][ 1 ]
            if( sig_coeff_flag[ xC ][ yC ] ) {
                TransCoeffLevel[ x0 ][ y0 ][ cIdx ][ xC ][ yC ] =
                    AbsLevel[ xC ][ yC ] * ( 1 - 2 * coeff_sign_flag[ n ] )
                if( signHidden ) {
                    sumAbsLevel += AbsLevel[ xC][ yC ]
                    if( ( n = = firstSigScanPosSb ) && ( sumAbsLevel % 2 ) = =
1 ) )
                        TransCoeffLevel[ x0 ][ y0 ][ cIdx ][ xC ][ yC ] =
                            -TransCoeffLevel[ x0 ][ y0 ][ cIdx ][ xC ][ yC ]
                }
            }
        }
    }
    else {
        ...
    }
    if( cu_mts_flag[ x0 ][ y0 ] && ( cIdx = = 0 ) &&
        !transform_skip_flag[ x0 ][ y0 ][ cIdx ] &&
        ( ( CuPredMode[ x0 ][ y0 ] = = MODE_INTRA && numSigCoeff > 2 ) ||
            ( CuPredMode[ x0 ][ y0 ] = = MODE_INTER ) ) ) {
        mts_idx[ x0 ][ y0 ]                                                     ae(v)
}
```

Figure 12:
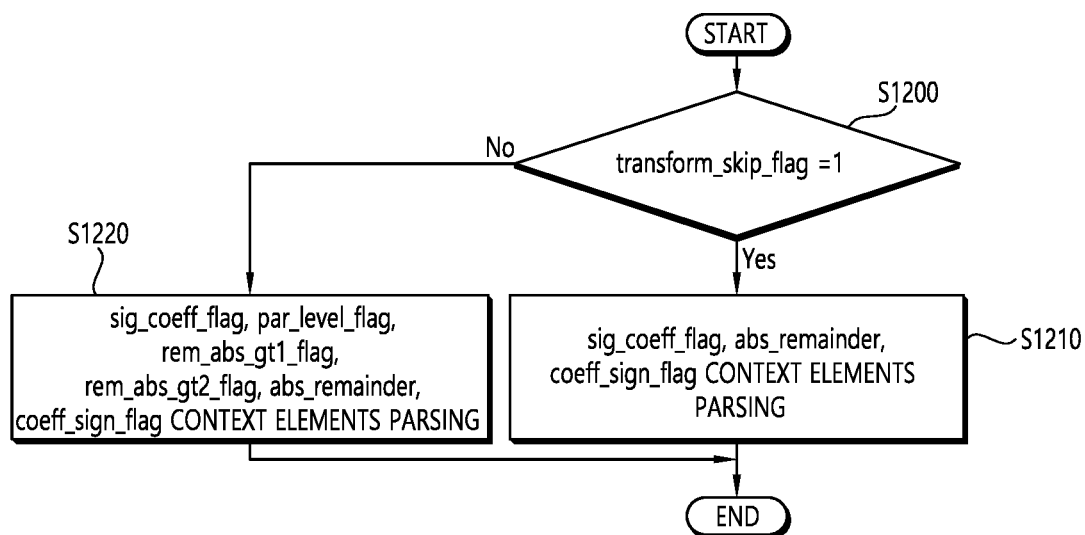
FIG. 12 is a control flowchart illustrating a method of parsing a context element according to still another embodiment of the present disclosure.

FIG. 12 is a control flowchart illustrating a process of parsing a context element according to the present embodiment. The context element parsing according to the transform skip flag according to FIG. 12 will be described as follows.

First, a transform skip flag (transform_skip_flag) indicating whether a transform process has been performed on a transform block is parsed to determine whether or not transform_skip_flag is 1 (S1200).

As a result of the determination, in the case of the residual value whose transform_skip_flag is 1, that is, for which the transform has been skipped without being applied, the context elements of sig_coeff_flag, abs_remainder, and coeff_sign_flag may be encoded, and the context elements of sig_coeff_flag, abs_remainder, and coeff_sign_flag may be parsed (S1210). In this case, the context elements may be sequentially parsed or the parsing order may be changed.

Contrarily, in the case of the residual value whose transform_skip_flag is 0, that is, to which the transform has been applied, the context elements of sig_coeff_flag, par_level_flag, rem_abs_gt1_flag, rem_abs_gt2_flag, abs_remainder, and coeff_sign_flag may be encoded, and the context elements of sig_coeff_flag, par_level_flag, rem_abs_gt1_flag, rem_abs_gt2_flag, abs_remainder, and coeff_sign_flag may be parsed (S1220). In this case, the context elements may be sequentially parsed or the parsing order may be changed.

That is, in the case of the residual value to which the transform has not been applied, par_level_flag, rem_abs_gt1_flag and rem_abs_gt2_flag are not encoded and decoded, when compared with the residual value to which the transform has been applied. In a case where the residual value is large, when all of the syntax elements, such as sig_coeff_flag, par_level_flag, rem_abs_gt1_flag and _ rem_abs_gt2_flag, are expressed in all coefficients, redundant information is more likely to be transmitted compared to transmitting the level value by binarizing it as it is, and thus, in the present embodiment, encoding efficiency is improved by omitting the context elements of par_level_ flag, rem_abs_gt1_flag and rem_abs_gt2_flag.

Meanwhile, based on the technique of decoding the residual based on Table 1 and the transform skip flag, still another embodiment according to the present disclosure proposes a method of determining a context element when the current decoding target block is a residual of an untransformed pixel domain.

In the case of a general transform domain residual, the residual signal is expressed as a level value for each frequency component, and in the high frequency region, the probability of being expressed as zero or a number close to zero by quantization increases. Therefore, in Table 1, a method was used in which the subsequent context element parsing may be omitted by first encoding sig_coeff_flag, which is a context element for whether or not the current transform coefficient value is 0.

When sig_coeff_flag is not 0, rem_abs_gt1_flag, par_level_flag, rem_abs_gt2_flag, and the like may be sequentially encoded according to the value of the current transform coefficient. However, in the case of a residual signal of a pixel domain that has not been subjected to the transform, the absolute level value of the signal has randomness.

The context-encoded syntax element may include at least one of the sig_coeff_flag, par_level_flag, rem_abs_gt1_flag, and/or rem_abs_gt2_flag as a syntax element that is encoded through arithmetic coding based on context. In addition, hereinafter, the context encoding bin may indicate a context-encoded bin for at least one of said sig_coeff_flag, par_level_flag, rem_abs_gt1_flag, and/or rem_abs_gt2_flag.

In general, in a case where the value of the residual signal is large, when all of the syntax elements, such as sig_coeff_flag, par_level_flag, rem_abs_gt1_flag, and rem_abs_gt2_flag, are expressed in all coefficients, redundant information is more likely to be transmitted compared to transmitting the level value by binarizing it as it is. Accordingly, the present embodiment proposes a method of improving encoding efficiency by omitting some context elements for the residual signal of the pixel domain.

The proposed method may be branched based on the transform_skip_flag context element in Table 1, and, the existing method that does not correspond to the branch statement may follow, for example, the context element (sig_coeff_flag, par_level_flag, rem_abs_gt1_flag, rem_abs_gt2_flag, abs_remainder, coeff_sign_flag) of Table 1, or may be encoded and decoded including the context element defined above. That is, when the transform is applied, context elements of sig_coeff_flag, par_level_flag, rem_abs_gt1_flag, rem_abs_gt2_flag, abs_remainder, and coeff_sign_flag may be encoded and decoded as shown in Table 1.

Meanwhile, the residual signal to which the transforma has not been applied may be encoded and decoded through context elements of abs_remainder and coeff_sign_flag.

In addition, according to an example, when all the number of bin for the context encoding syntax element has been used, only abs_remainder and coeff_sign_flag may be coded or decoded/parsed without coding or decoding/parsing the context encoding syntax element any more.

Table 8 shows the context elements according to the present embodiment.

TABLE 8

| | Descriptor |
|---|---|
| residual_coding( x0, y0, log2TbWidth, log2TbHeight, cIdx ) { | |
|   if( transform_skip_enabled_flag && | |
|   ( cIdx ! = 0 \|\| cu_mts_flag[ x0 ][ y0 ] = = 0 ) && | |
|     ( log2TbWidth <= wN ) && ( log2TbHeight <= hN ) ) | |
|     transform_skip_flag[ x0 ][ y0 ][ cIdx ] | ae(v) |
| ... | |
|   if (transform_skip_flag[x0][y0][cIdx] | |
|   { | |
|     for( n = ( i = = lastSubBlock ) ? lastScanPos − 1 : numSbCoeff − 1; n >= 0; n− − ) { | |
|       xC = ( xS << log2SbSize ) + DiagScanOrder[ log2SbSize ][ log2SbSize ][ n ][ 0 ] | |
|       yC = ( yS << log2SbSize ) + DiagScanOrder[ log2SbSize ][ log2SbSize ][ n ][ 1 ] | |
|       abs_remainder[ n ] | |
|       AbsLevel[ xC ][ yC ] = abs_remainder[ n ] | |
|     } | |
|     if( !sign_data_hiding_enabled_flag ) | |
|       signHidden = 0 | |
|     else | |
|       signHidden = ( lastSigScanPosSb − firstSigScanPosSb > 3 ? 1 : 0 ) | |
|     for( n = numSbCoeff − 1; n >= 0; n− − ) { | |
|       xC = ( xS << log2SbSize ) + DiagScanOrder[ log2SbSize ][ log2SbSize ][ n ][ 0 ] | |
|       yC = ( yS << log2SbSize ) + DiagScanOrder[ log2SbSize ][ log2SbSize ][ n ][ 1 ] | |
|       if( sig_coeff_flag[ xC ][ yC ] && | |
|         ( !signHidden \|\| ( n != firstSigScanPosSb ) ) ) | |
|         coeff_sign_flag[ n ] | ae(v) |
|   } | |
|   sumAbsLevel = 0 | |
|   for( n = numSbCoeff − 1; n >= 0; n− − ) { | |
|     xC = ( xS << log2SbSize ) + DiagScanOrder[ log2SbSize ][ log2SbSize ][ n ][ 0 ] | |
|     yC = ( yS << log2SbSize ) + DiagScanOrder[ log2SbSize ][ log2SbSize ][ n ][ 1 ] | |
|     TransCoeffLevel[ x0 ][ y0 ][ cIdx ][ xC ][ yC ] = AbsLevel[ xC ][ yC ] * ( 1 − 2 * coeff_sign_flag[ n ] ) | |
|     if( signHidden ) { | |
|       sumAbsLevel += AbsLevel[ xC ][ yC ] | |
|       if( ( n = = firstSigScanPosSb ) && ( sumAbsLevel % 2 ) = = 1 ) ) | |
|         TransCoeffLevel[ x0 ][ y0 ][ cIdx ][ xC ][ yC ] = −TransCoeffLevel[ x0 ][ y0 ][ cIdx ][ xC ][ yC ] | |
|     } | |
|   } | |
| } | |

TABLE 8-continued

| | Descriptor |
|---|---|
| `}`<br>`else {`<br>  ...<br>`}`<br>`if( cu__mts__flag[ x0 ][ y0 ] && ( cIdx = = 0 ) &&`<br>  `!transform__skip__flag[ x0 ][ y0 ][ cIdx ] &&`<br>  `( ( CuPredMode[ x0 ][ y0 ] = = MODE__INTRA && numSigCoeff > 2 ) ||`<br>    `( CuPredMode[ x0 ][ y0 ] = = MODE__INTER ) ) ) {`<br>    `mts__idx[ x0 ][ y0 ]`<br>`}` | ae(v) |

Figure 13:
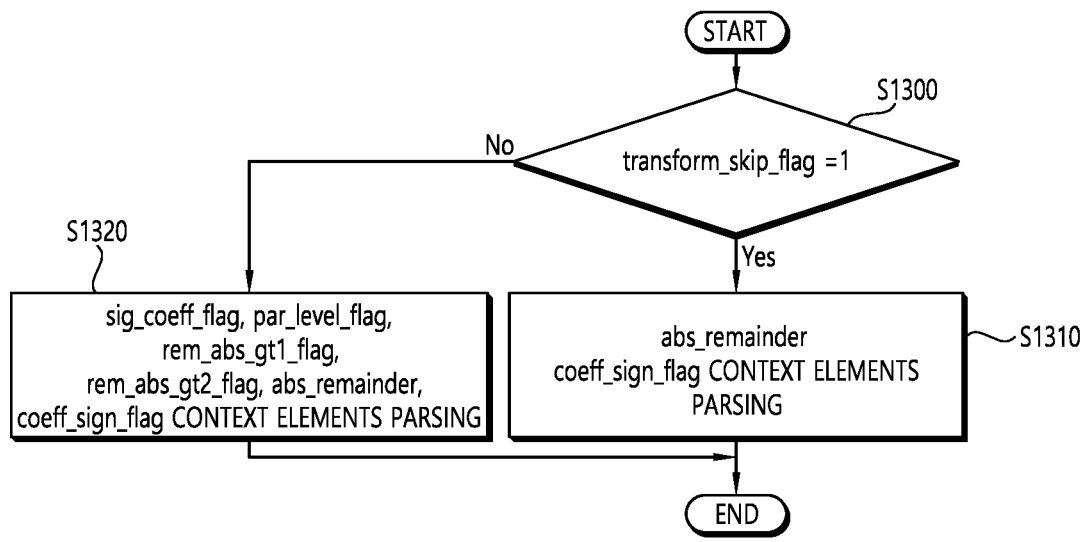
FIG. 13 is a control flowchart illustrating a method of parsing a context element according to still another embodiment of the present disclosure.

FIG. 13 is a control flowchart illustrating a process of parsing a context element according to the present embodiment. The context element parsing according to the transform skip flag according to FIG. 13 will be described as follows.

First, a transform skip flag (transform_skip_flag) indicating whether a transform process has been performed on a transform block is parsed to determine whether or not transform_skip_flag is 1 (S1300).

As a result of the determination, in the case of the residual value whose transform_skip_flag is 1, that is, for which the transform has been skipped without being applied, the context elements of abs_remainder and coeff_sign_flag may be encoded, and the context elements of abs_remainder and coeff_sign_flag may be parsed (S1310). In this case, the context elements may be sequentially parsed or the parsing order may be changed.

Contrarily, in the case of the residual value whose transform_skip_flag is 0, that is, to which the transform has been applied, the context elements of sig_coeff_flag, par_level_flag, rem_abs_gt1_flag, rem_abs_gt2_flag, abs_remainder, and coeff_sign_flag may be encoded, and the context elements of sig_coeff_flag, par_level_flag, rem_abs_gt1_flag, rem_abs_gt2_flag, abs_remainder, and coeff_sign_flag may be parsed (S1320). In this case, the context elements may be sequentially parsed or the parsing order may be changed.

That is, in the case of the residual value to which the transform has not been applied, sig_coeff_flag, par_level_flag, rem_abs_gt1_flag and rem_abs_gt2_flag are not encoded and decoded, when compared with the residual value to which the transform has been applied. In a case where the residual value is large, when all of the syntax elements, such as sig_coeff_flag, par_level_flag, rem_abs_gt1_flag and _rem_abs_gt2_flag, are expressed in all coefficients, redundant information is more likely to be transmitted compared to transmitting the level value by binarizing it as it is, and thus, in the present embodiment, encoding efficiency is improved by omitting the context elements of sig_coeff_flag, par_level_flag, rem_abs_gt1_flag and rem_abs_gt2_flag.

Meanwhile, based on the technique of decoding the residual based on Table 1 and the transform skip flag, still another embodiment according to the present disclosure proposes a method of determining a context element when the current decoding target block is a residual of an untransformed pixel domain.

In the case of a general transform domain residual, the residual signal is expressed as a level value for each frequency component, and in the high frequency region, the probability of being expressed as zero or a number close to zero by quantization increases. Therefore, in Table 1, a method was used in which the subsequent context element parsing may be omitted by first encoding sig_coeff_flag, which is a context element for whether or not the current transform coefficient value is 0.

When sig_coeff_flag is not 0, rem_abs_gt1_flag, par_level_flag, rem_abs_gt2_flag, and the like may be sequentially encoded according to the value of the current transform coefficient. However, in the case of a residual signal of a pixel domain that has not been subjected to the transform, the absolute level value of the signal has randomness.

The context-encoded syntax element may include at least one of the sig_coeff_flag, par_level_flag, rem_abs_gt1_flag, and/or rem_abs_gt2_flag as a syntax element that is encoded through arithmetic coding based on context. In addition, hereinafter, the context encoding bin may indicate a context-encoded bin for at least one of said sig_coeff_flag, par_level_flag, rem_abs_gt1_flag, and/or rem_abs_gt2_flag.

In general, in a case where the value of the residual signal is large, when all of the syntax elements, such as sig_coeff_flag, par_level_flag, rem_abs_gt1_flag, and _rem_abs_gt2_flag, are expressed in all coefficients, redundant information is more likely to be transmitted compared to transmitting the level value by binarizing it as it is. Accordingly, the present embodiment proposes a method of improving encoding efficiency by omitting some context elements for the residual signal of the pixel domain.

The proposed method may be branched based on the transform_skip_flag context element in Table 1, and, the existing method that does not correspond to the branch statement may follow, for example, the context element (sig_coeff_flag, par_level_flag, rem_abs_gt1_flag, rem_abs_gt2_flag, abs_remainder, coeff_sign_flag) of Table 1, or may be encoded and decoded including the context element defined above. That is, when the transform is applied, context elements of sig_coeff_flag, par_level_flag, rem_abs_gt1_flag, rem_abs_gt2_flag, abs_remainder, and coeff_sign_flag may be encoded and decoded as shown in Table 1.

Meanwhile, the residual signal to which the transforma has not been applied may be encoded and decoded through context elements of sig_coeff_flag, rem_abs_gt1_flag, abs_remainder, and coeff_sign_flag.

Table 9 shows the context elements according to the present embodiment.

TABLE 9

| | Descriptor |
|---|---|
| residual_coding( x0, y0, log2TbWidth, log2TbHeight, cIdx ) { <br>  if( transform_skip_enabled_flag && <br>  ( cIdx ! = 0 || cu_mts_flag[ x0 ][ y0 ] = = 0 ) && <br>    ( log2TbWidth <= wN ) && ( log2TbHeight <= hN ) ) <br>    transform_skip_flag[ x0 ][ y0 ][ cIdx ] | ae(v) |
| ... <br>if ( transform_skip_flag[x0][y0][cIdx] ) <br>{ <br>    for( n = ( i = = lastSubBlock ) ? lastScanPos − 1 : numSbCoeff − 1; n >= 0; n− − ) { <br>      xC = ( xS << log2SbSize ) + <br>DiagScanOrder[ log2SbSize ][ log2SbSize ][ n ][ 0 ] <br>      yC = ( yS << log2SbSize ) + <br>DiagScanOrder[ log2SbSize ][ log2SbSize ][ n ][ 1 ] <br>      if( coded_sub_block_flag[ xS ][ yS ] && ( n > 0 <br>  || !inferSbDcSigCoeffFlag ) ) { <br>        sig_coeff_flag[ xC ][ yC ] | ae(v) |
|       } <br>      if( sig_coeff_flag[ xC ][ yC ] ) { <br>        rem_abs_gt1_flag[ n ] <br>        if( lastSigScanPosSb = = −1 ) <br>          lastSigScanPosSb = n <br>        firstSigScanPosSb = n <br>      } <br>      AbsLevelPass1[ xC ][ yC ] = <br>        sig_coeff_flag[ xC][ yC ] + rem_abs_gt1_flag[ n ] <br>    } <br>    for( n = numSbCoeff − 1; n >= 0; n− − ) { <br>      xC = ( xS << log2SbSize ) + <br>DiagScanOrder[ log2SbSize ][ log2SbSize ][ n ][ 0 ] <br>      yC = ( yS << log2SbSize ) + <br>DiagScanOrder[ log2SbSize ][ log2SbSize ][ n ][ 1 ] <br>      if( rem_abs_gt1_flag[ n ] ) <br>        abs_remainder[ n ] | ae(v) |
|       AbsLevel[ xC ][ yC ] = AbsLevelPass1[ xC ][ yC ] + <br>          abs_remainder[ n ] <br>    } <br>    signHidden = ( lastSigScanPosSb − firstSigScanPosSb > 3 ? 1 : 0 ) <br>    for( n = numSbCoeff − 1; n >= 0; n− − ) { <br>      xC = ( xS << log2SbSize ) + <br>DiagScanOrder[ log2SbSize ][ log2SbSize ][ n ][ 0 ] <br>      yC = ( yS << log2SbSize ) + <br>DiagScanOrder[ log2SbSize ][ log2SbSize ][ n ][ 1 ] <br>      if( sig_coeff_flag[ xC ][ yC ] && <br>        ( !signHidden || ( n != firstSigScanPosSb ) ) ) <br>        coeff_sign_flag[ n ] | ae(v) |
|     } <br>    sumAbsLevel = 0 <br>    for( n = numSbCoeff − 1; n >= 0; n− − ) { <br>      xC = ( xS << log2SbSize ) + <br>        DiagScanOrder[ log2SbSize ][ log2SbSize ][ n ][ 0 ] <br>      yC = ( yS << log2SbSize ) + <br>        DiagScanOrder[ log2SbSize ][ log2SbSize ][ n ][ 1 ] <br>      if( sig_coeff_flag[ xC ][ yC ] ) { <br>        TransCoeffLevel[ x0 ][ y0 ][ cIdx ][ xC ][ yC ] = <br>          AbsLevel[ xC ][ yC ] * ( 1 − 2 * coeff_sign_flag[ n ] ) <br>        if( signHidden ) { <br>          sumAbsLevel += AbsLevel[ xC][ yC ] <br>          if( ( n = = firstSigScanPosSb ) && ( sumAbsLevel % 2 ) = = 1 ) ) <br>            TransCoeffLevel[ x0 ][ y0 ][ cIdx ][ xC ][ yC ] = <br>              −TransCoeffLevel[ x0 ][ y0 ][ cIdx ][ xC ][ yC ] <br>        } <br>      } <br>    } <br>  } <br>} <br>else { //!transform_skip_flag <br>... <br>} <br>  if( cu_mts_flag[ x0 ][ y0 ] && ( cIdx = = 0 ) && <br>    !transform_skip_flag[ x0 ][ y0 ][ cIdx ] && <br>    ( ( CuPredMode[ x0 ][ y0 ] = = MODE_INTRA && numSigCoeff > 2 ) || <br>      ( CuPredMode[ x0 ][ y0 ] = = MODE_INTER ) ) ) { <br>    mts_idx[ x0 ][ y0 ] | ae(v) |
| } | |

Figure 14:
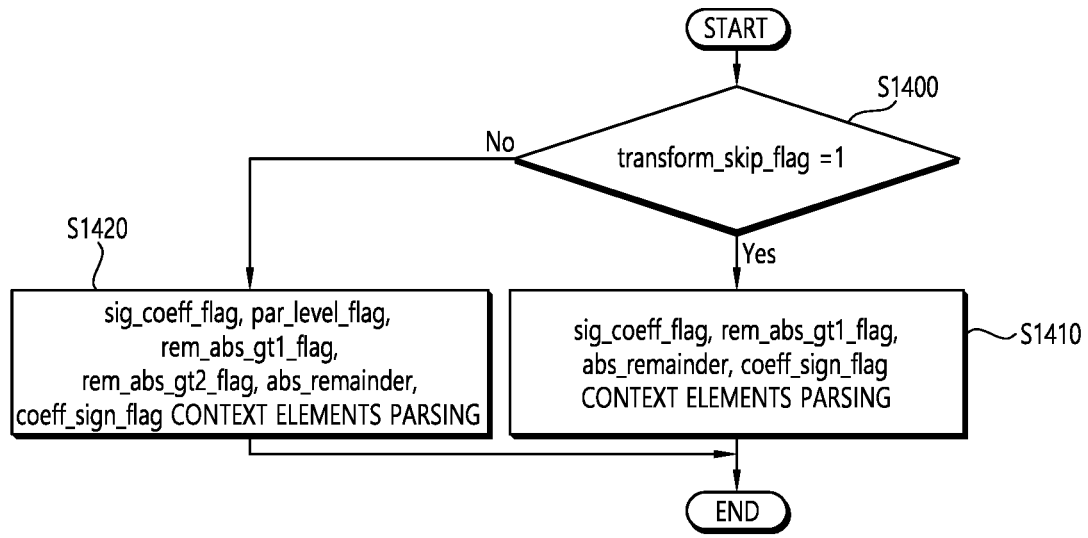
FIG. 14 is a control flowchart illustrating a method of parsing a context element according to still another embodiment of the present disclosure.

FIG. 14 is a control flowchart illustrating a process of parsing a context element according to the present embodiment. The context element parsing according to the transform skip flag according to FIG. 14 will be described as follows.

First, a transform skip flag (transform_skip_flag) indicating whether a transform process has been performed on a transform block is parsed to determine whether or not transform_skip_flag is 1 (S1400).

As a result of the determination, in the case of the residual value whose transform_skip_flag is 1, that is, for which the transform has been skipped without being applied, the context elements of sig_coeff_flag, rem_abs_gt1_flag, abs_remainder, and coeff_sign_flag may be encoded, and the context elements of sig_coeff_flag, rem_abs_gt1_flag, abs_remainder, and coeff_sign_flag may be parsed (S1410). In this case, the context elements may be sequentially parsed or the parsing order may be changed.

Contrarily, in the case of the residual value whose transform_skip_flag is 0, that is, to which the transform has been applied, the context elements of sig_coeff_flag, par_level_flag, rem_abs_gt1_flag, rem_abs_gt2_flag, abs_remainder, and coeff_sign_flag may be encoded, and the context elements of sig_coeff_flag, par_level_flag, rem_abs_gt1_flag, rem_abs_gt2_flag, abs_remainder, and coeff_sign_flag may be parsed (S1420). In this case, the context elements may be sequentially parsed or the parsing order may be changed.

That is, in the case of the residual value to which the transform has not been applied, par_level_flag and rem_abs_gt2_flag are not encoded and decoded, when compared with the residual value to which the transform has been applied. In a case where the residual value is large, when all of the syntax elements, such as sig_coeff_flag, par_level_flag, rem_abs_gt1_flag and rem_abs_gt2_flag, are expressed in all coefficients, redundant information is more likely to be transmitted compared to transmitting the level value by binarizing it as it is, and thus, in the present embodiment, encoding efficiency is improved by omitting the context elements of par_level_flag and rem_abs_gt2_flag.

Meanwhile, based on the technique of decoding the residual based on Table 1 and the transform skip flag, still another embodiment according to the present disclosure proposes a method of determining a context element when the current decoding target block is a residual of an untransformed pixel domain.

In the case of a general transform domain residual, the residual signal is expressed as a level value for each frequency component, and in the high frequency region, the probability of being expressed as zero or a number close to zero by quantization increases. Therefore, in Table 1, a method was used in which the subsequent context element parsing may be omitted by first encoding sig_coeff_flag, which is a context element for whether or not the current transform coefficient value is 0.

When sig_coeff_flag is not 0, rem_abs_gt1_flag, par_level_flag, rem_abs_gt2_flag, and the like may be sequentially encoded according to the value of the current transform coefficient. However, in the case of a residual signal of a pixel domain that has not been subjected to the transform, the absolute level value of the signal has randomness.

The context-encoded syntax element may include at least one of the sig_coeff_flag, par_level_flag, rem_abs_gt1_flag, and/or rem_abs_gt2_flag as a syntax element that is encoded through arithmetic coding based on context. In addition, hereinafter, the context encoding bin may indicate a context-encoded bin for at least one of said sig_coeff_flag, par_level_flag, rem_abs_gt1_flag, and/or rem_abs_gt2_flag.

In general, in a case where the value of the residual signal is large, when all of the syntax elements, such as sig_coeff_flag, par_level_flag, rem_abs_gt1_flag, and rem_abs_gt2_flag, are expressed in all coefficients, redundant information is more likely to be transmitted compared to transmitting the level value by binarizing it as it is. Accordingly, the present embodiment proposes a method of improving encoding efficiency by omitting some context elements for the residual signal of the pixel domain.

The proposed method may be branched based on the transform_skip_flag context element in Table 1, and, the existing method that does not correspond to the branch statement may follow, for example, the context element (sig_coeff_flag, par_level_flag, rem_abs_gt1_flag, rem_abs_gt2_flag, abs_remainder, coeff_sign_flag) of Table 1, or may be encoded and decoded including the context element defined above. That is, when the transform is applied, context elements of sig_coeff_flag, par_level_flag, rem_abs_gt1_flag, rem_abs_gt2_flag, abs_remainder, and coeff_sign_flag may be encoded and decoded as shown in Table 1.

Meanwhile, the residual signal to which the transforma is not applied may be encoded and decoded through context elements of sig_coeff_flag, rem_abs_gt1_flag, rem_abs_gt2_flag, abs_remainder, and coeff_sign_flag.

Table 10 shows the context elements according to the present embodiment.

TABLE 10

| | Descriptor |
|---|---|
| residual_coding( x0, y0, log2TbWidth, log2TbHeight, cIdx ) { | |
|   if( transform_skip_enabled_flag && | |
|     ( cIdx ! = 0 \|\| cu_mts_flag[ x0 ][ y0 ] = = 0 ) && | |
|       ( log2TbWidth <= wN ) && ( log2TbHeight <= hN ) ) | |
|         transform_skip_flag[ x0 ][ y0 ][ cIdx ] | ae(v) |
| ... | |
| if ( transform_skip_flag[x0][y0][cIdx] ) | |
| { | |
|     for( n = ( i = = lastSubBlock ) ? lastScanPos − 1 : numSbCoeff − 1; n >= 0; n− − ) { | |
|       xC = ( xS << log2SbSize ) + DiagScanOrder[ log2SbSize ][ log2SbSize ][ n ][ 0 ] | |
|       yC = ( yS << log2SbSize ) + DiagScanOrder[ log2SbSize ][ log2SbSize ][ n ][ 1 ] | |
|       if( coded_sub_block_flag[ xS ][ yS ] && ( n > 0 \|\| !inferSbDcSigCoeffFlag ) ) { | |
|         sig_coeff_flag[ xC ][ yC ] | ae(v) |
|       } | |

TABLE 10-continued

| | Descriptor |
|---|---|
| ```
        if( sig_coeff_flag[ xC ][ yC ] ) {
          rem_abs_gt1_flag[ n ]
          if( lastSigScanPosSb = = −1 )
            lastSigScanPosSb = n
          firstSigScanPosSb = n
        }
        AbsLevelPass1[ xC ][ yC ] =
            sig_coeff_flag[ xC ][ yC ] + rem_abs_gt1_flag[ n ]
      }
      for( n = numSbCoeff − 1; n >= 0; n− − ) {
        if( rem_abs_gt1_flag[ n ] )
          rem_abs_gt2_flag[ n ]
      }
      for( n = numSbCoeff − 1; n >= 0; n− − ) {
        xC = ( xS << log2SbSize ) +
  DiagScanOrder[ log2SbSize ][ log2SbSize ][ n ][ 0 ]
        yC = ( yS << log2SbSize ) +
  DiagScanOrder[ log2SbSize ][ log2SbSize ][ n ][ 1 ]
        if( rem_abs_gt2_flag[ n ] )
          abs_remainder[ n ]
          AbsLevel[ xC ][ yC ] = AbsLevelPass1[ xC ][ yC ] + rem_abs_gt2_flag[ n ]
              abs_remainder[ n ]
      }
      signHidden = ( lastSigScanPosSb − firstSigScanPosSb > 3 ? 1 : 0 )
      for( n = numSbCoeff − 1; n >= 0; n− − ) {
        xC = ( xS << log2SbSize ) +
  DiagScanOrder[ log2SbSize ][ log2SbSize ][ n ][ 0 ]
        yC = ( yS << log2SbSize ) +
  DiagScanOrder[ log2SbSize ][ log2SbSize ][ n ][ 1 ]
          if( sig_coeff_flag[ xC ][ yC ] &&
            ( !signHidden || ( n != firstSigScanPosSb ) ) )
            coeff_sign_flag[ n ]
      }
      sumAbsLevel = 0
      for( n = numSbCoeff − 1; n >= 0; n− − ) {
        xC = ( xS << log2SbSize ) +
            DiagScanOrder[ log2SbSize ][ log2SbSize ][ n ][ 0 ]
        yC = ( yS << log2SbSize ) +
            DiagScanOrder[ log2SbSize ][ log2SbSize ][ n ][ 1 ]
        if( sig_coeff_flag[ xC ][ yC ] ) {
          TransCoeffLevel[ x0 ][ y0 ][ cIdx ][ xC ][ yC ] =
              AbsLevel[ xC ][ yC ] * ( 1 − 2 * coeff_sign_flag[ n ] )
          if( signHidden ) {
            sumAbsLevel += AbsLevel[ xC ][ yC ]
            if( ( n = = firstSigScanPosSb ) && ( sumAbsLevel % 2 ) = =
  1 ) )
              TransCoeffLevel[ x0 ][ y0 ][ cIdx ][ xC ][ yC ] =
                  −TransCoeffLevel[ x0 ][ y0 ][ cIdx ][ xC ][ yC ]
          }
        }
      }
    }
  }
  else { //!transform_skip_flag
  ...
  }
  if( cu_mts_flag[ x0 ][ y0 ] && ( cIdx = = 0 ) &&
    !transform_skip_flag[ x0 ][ y0 ][ cIdx ] &&
    ( ( CuPredMode[ x0 ][ y0 ] = = MODE_INTRA && numSigCoeff > 2 ) ||
      ( CuPredMode[ x0 ][ y0 ] = = MODE_INTER ) ) ) {
    mts_idx[ x0 ][ y0 ]
  }
``` | ae(v)<br><br><br><br><br><br><br><br>ae(v)<br><br><br><br><br><br>ae(v)<br><br><br><br><br><br><br><br><br><br>ae(v)<br><br><br><br><br><br><br><br><br><br><br><br><br><br><br><br><br><br><br><br><br><br><br><br><br><br>ae(v) |

Figure 15:
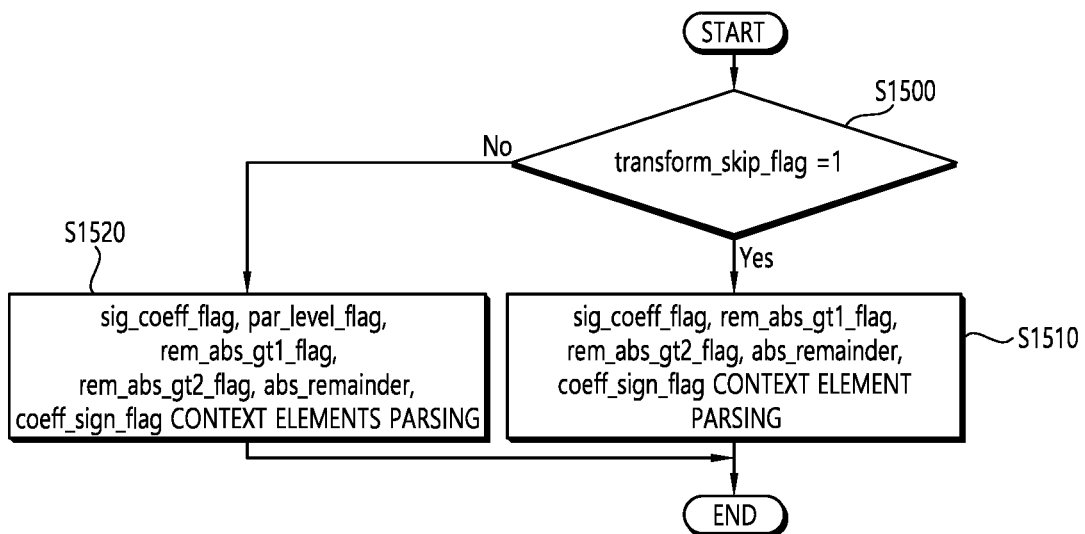
FIG. 15 is a control flowchart illustrating a method of parsing a context element according to still another embodiment of the present disclosure.

FIG. 15 is a control flowchart illustrating a process of parsing a context element according to the present embodiment. The context element parsing according to the transform skip flag according to FIG. 15 will be described as follows.

First, a transform skip flag (transform_skip_flag) indicating whether a transform process has been performed on a transform block is parsed to determine whether or not transform_skip_flag is 1 (S1500).

As a result of the determination, in the case of the residual value whose transform_skip_flag is 1, that is, for which the transform has been skipped without being applied, the context elements of sig_coeff_flag, rem_abs_gt1_flag, rem_abs_gt2_flag, abs_remainder, and coeff_sign_flag may be encoded, and the context elements of sig_coeff_flag, rem_abs_gt1_flag, rem_abs_gt2_flag, abs_remainder, and coeff_sign_flag may be parsed (S1510). In this case, the context elements may be sequentially parsed or the parsing order may be changed.

Contrarily, in the case of the residual value whose transform_skip_flag is 0, that is, to which the transform has been applied, the context elements of sig_coeff_flag, par_level_flag, rem_abs_gt1_flag, rem_abs_gt2_flag, abs_remainder, and coeff_sign_flag may be encoded, and the context elements of sig_coeff_flag, par_level_flag, rem_abs_gt1_flag, rem_abs_gt2_flag, abs_remainder, and coeff_sign_flag may be parsed (S1520). In this case, the context elements may be sequentially parsed or the parsing order may be changed.

That is, in the case of the residual value to which the transform is not applied, par_level_flag is not encoded and decoded, when compared with the residual value to which the transform is applied. In a case where the residual value is large, when all of the syntax elements, such as sig_coeff_flag, par_level_flag, rem_abs_gt1_flag and rem_abs_gt2_flag, are expressed in all coefficients, redundant information is more likely to be transmitted compared to transmitting the level value by binarizing it as it is, and thus, in the present embodiment, encoding efficiency is improved by omitting the context element of par_level_flag.

Syntax elements rem_abs_gt1_flag and rem_abs_gt2_flag may be represented based on abs_level_gtx_flag[n][j] as described above, and may also be expressed as abs_rem_gt1_flag and abs_rem_gt2_flag, or abs_rem_gtx_flag.

As described above, according to embodiments of the present disclosure, different residual coding schemes, that is, residual syntax, may be applied depending on whether or not transform skip is applied for residual coding.

For example, the signaling order of the flag (coeff_sign_flag) for the sign of the transform coefficient may be different depending on whether or not the transform skip is applied. When transformation skip is not applied, coeff_sign_flag is signaled after abs_remainder, while when transform skip is applied, coeff_sign_flag may be signaled before rem_abs_gt1_flag.

In addition, for example, rem_abs_gt1_flag, rem_abs_gt2_flag, that is, rem_abs_gtx_flag parsing and a parsing loop for abs_remainder may vary depending on whether transform skip is applied.

Additionally, the context syntax element encoded through arithmetic coding based on context may include a significant coefficient flag (sig_coeff_flag) indicating whether or not the quantized transform coefficient is a non-zero significant coefficient, a parity level flag (par_level_flag) for parity of a transform coefficient level for the quantized transform coefficient, a first transform coefficient level flag (rem_abs_gt1_flag) for whether or not the transform coefficient level is greater than a first threshold, and a second transform coefficient level flag (rem_abs_gt2_flag) for whether the transform coefficient level of the quantized transform coefficient is greater than a second threshold. In this case, the decoding of the first transform coefficient level flag may be performed prior to the decoding of the parity level flag.

Tables 11 to 13 show the context elements according to above-described example.

TABLE 11

| | |
|---|---|
| transform_skip_flag[ x0 ][ y0 ] | ae(v) |
| if( ( ( CuPredMode[ chType ][ x0 ][ y0 ] = = MODE_INTER && | |
| sps_explicit_mts_inter_enabled_flag ) | |
| \|\| ( CuPredMode[ chType ][ x0 ][ y0 ] = = MODE_INTRA && | |
| sps_explicit_mts_intra_enabled_flag ) ) && ( !transform_skip_flag[ x0 ][ y0 ] ) ) | |
|   tu_mts_idx[ x0 ][ y0 ] | ae(v) |
| } | |
| if( tu_cbf_luma[ x0 ][ y0 ] ) { | |
|   if( !transform_skip_flag[ x0 ][ y0 ] ) | |
|     residual_coding( x0, y0, Log2( tbWidth ), Log2( tbHeight ), 0 ) | |
|   else | |
|     residual_ts_coding( x0, y0, Log2( tbWidth ), Log2( tbHeight ), 0 ) | |
| } | |
| if( tu_cbf_cb[ x0 ][ y0 ] ) | |
|   residual_coding( xC, yC, Log2( wC ), Log2( hC ), 1 ) | |
| if( tu_cbf_cr[ x0 ][ y0 ] && | |
|   !( tu_cbf_cb[ x0 ][ y0 ] && tu_joint_cbcr_residual_flag[ x0 ][ y0 ] )) { | |
|   residual_coding( xC, yC, Log2( wC ), Log2( hC ), 2 ) | |
| } | |
| } | |

TABLE 12

| | Descriptor |
|---|---|
| residual_coding( x0, y0, log2TbWidth, log2TbHeight, cIdx ) { | |
|   if( ( tu_mts_idx[ x0 ][ y0 ] > 0 \|\| | |
|     ( cu_sbt_flag && log2TbWidth < 6 && log2TbHeight < 6 ) ) | |
|     && cIdx = = 0 && log2TbWidth > 4 ) | |
|     log2ZoTbWidth = 4 | |
|   else | |
|     log2ZoTbWidth = Min( log2TbWidth, 5 ) | |
|   MaxCcbs = 2 * ( 1 << log2TbWidth ) * ( 1<< log2TbHeight ) | |
|   if( tu_mts_idx[ x0 ][ y0 ] > 0 \|\| | |
|     ( cu_sbt_flag && log2TbWidth < 6 && log2TbHeight < 6 ) ) | |
|     && cIdx = = 0 && log2TbHeight > 4 ) | |
|     log2ZoTbHeight = 4 | |
|   else | |
|     log2ZoTbHeight = Min( log2TbHeight, 5 ) | |
|   if( log2TbWidth > 0 ) | |
|     last_sig_coeff_x_prefix | ae(v) |
|   if( log2TbHeight > 0 ) | |
|     last_sig_coeff_y_prefix | ae(v) |
|   if( last_sig_coeff_x_prefix > 3 ) | |

TABLE 12-continued

| | Descriptor |
|---|---|
|     last_sig_coeff_x_suffix | ae(v) |
| if( last_sig_coeff_y_prefix > 3 ) | |
|     last_sig_coeff_y_suffix | ae(v) |

```
    log2TbWidth = log2ZoTbWidth
    log2TbHeight = log2ZoTbHeight
    remBinsPass1 = ( ( 1 << ( log2TbWidth + log2TbHeight ) ) * 7 ) >> 2
    log2SbW = ( Min( log2TbWidth, log2TbHeight ) < 2 ? 1 : 2 )
    log2SbH = log2SbW
    if( log2TbWidth + log2TbHeight > 3 ) {
        if( log2TbWidth < 2 ) {
            log2SbW = log2TbWidth
            log2SbH = 4 − log2SbW
        } else if( log2TbHeight < 2 ) {
            log2SbH = log2TbHeight
            log2SbW = 4 − log2SbH
        }
    }
    numSbCoeff = 1 << ( log2SbW + log2SbH )
    lastScanPos = numSbCoeff
    lastSubBlock = ( 1 << ( log2TbWidth + log2TbHeight − ( log2SbW + log2SbH ) ) ) − 1
    do {
        if( lastScanPos = = 0 ) {
            lastScanPos = numSbCoeff
            lastSubBlock− −
        }
        lastScanPos− −
        xS = DiagScanOrder[ log2TbWidth − log2SbW ][ log2TbHeight − log2SbH ]
                [ lastSubBlock ][ 0 ]
        yS = DiagScanOrder[ log2TbWidth − log2SbW ][ log2TbHeight − log2SbH ]
                [ lastSubBlock ][ 1 ]
        xC = ( xS << log2SbW ) + DiagScanOrder[ log2SbW ][ log2SbH ][ lastScanPos ][ 0 ]
        yC = ( yS << log2SbH ) + DiagScanOrder[ log2SbW ][ log2SbH ][ lastScanPos ][ 1 ]
    } while( ( xC != LastSignificantCoeffX ) || ( yC != LastSignificantCoeffY ) )
    if( lastSubBlock = = 0 && log2TbWidth >= 2 && log2TbHeight >= 2
&&
        !transform_skip_flag[ x0 ][ y0 ] && lastScanPos > 0 )
        LfnstDcOnly = 0
    if( ( lastSubBlock > 0 && log2TbWidth >= 2 && log2TbHeight >= 2 ) ||
        ( lastScanPos > 7 && ( log2TbWidth = = 2 || log2TbWidth = = 3 ) &&
        log2TbWidth = = log2TbHeight ) )
        LfnstZeroOutSigCoeffFlag = 0
    QState = 0
    for( i = lastSubBlock; i >= 0; i− − ) {
        startQStateSb = QState
        xS = DiagScanOrder[ log2TbWidth − log2SbW ][ log2TbHeight − log2SbH ]
                [ i ][ 0 ]
        yS = DiagScanOrder[ log2TbWidth − log2SbW ][ log2TbHeight − log2SbH ]
                [ i ][ 1 ]
        inferSbDcSigCoeffFlag = 0
        if( ( i < lastSubBlock ) && ( i > 0 ) ) {
            coded_sub_block_flag[ xS ][ yS ]                                                 ae(v)
            inferSbDcSigCoeffFlag = 1
        }
        firstSigScanPosSb = numSbCoeff
        lastSigScanPosSb = −1
        firstPosMode0 = ( i = = lastSubBlock ? lastScanPos : numSbCoeff − 1 )
        firstPosMode1 = −1
        for( n = firstPosMode0; n >= 0 && remBinsPass1 >= 4; n− − ) {
            xC = ( xS << log2SbW ) + DiagScanOrder[ log2SbW ][ log2SbH ][ n ][ 0 ]
            yC = ( yS << log2SbH ) + DiagScanOrder[ log2SbW ][ log2SbH ][ n ][ 1 ]
            if( coded_sub_block_flag[ xS ][ yS ] && ( n > 0 || !inferSbDcSigCoeffFlag )
&&
                ( xC != LastSignificantCoeffX || yC != LastSignificantCoeffY ) ) {
                sig_coeff_flag[ xC ][ yC ]                                                    ae(v)
                remBinsPass1− −
                if( sig_coeff_flag[ xC ][ yC ] )
                    inferSbDcSigCoeffFlag = 0
            }
            if( sig_coeff_flag[ xC ][ yC ] ) {
                abs_level_gtx_flag[ n ][ 0 ]                                                  ae(v)
                remBinsPass1− −
                if( abs_level_gtx_flag[ n ][ 0 ] ) {
                    par_level_flag[ n ]                                                       ae(v)
                    remBinsPass1− −
                    abs_level_gtx_flag[ n ][ 1 ]                                              ae(v)
                    remBinsPass1− −
                }
                if( lastSigScanPosSb = = −1 )
```

TABLE 12-continued

| | Descriptor |
|---|---|
| ```
            lastSigScanPosSb = n
            firstSigScanPosSb = n
         }
         AbsLevelPass1[ xC ][ yC ] = sig_coeff_flag[ xC][ yC ] + par_level_flag[ n ] +
                     abs_level_gtx_flag[ n ][ 0 ] + 2 * abs_level_gtx_flag[ n ][ 1 ]
         if( dep_quant_enabled_flag )
            QState = QStateTransTable[ QState ][ AbsLevelPass1[ xC ][ yC ] & 1 ]
         if( remBinsPass1 < 4 )
            firstPosMode1 = n − 1
      }
      for( n = numSbCoeff − 1; n >= firstPosMode1; n− − ) {
         xC = ( xS << log2SbW ) + DiagScanOrder[ log2SbW ][ log2SbH ][ n ][ 0 ]
         yC = ( yS << log2SbH ) + DiagScanOrder[ log2SbW ][ log2SbH ][ n ][ 1 ]
         if( abs_level_gtx_flag[ n ][ 1 ] )
            abs_remainder[ n ]
         AbsLevel[ xC ][ yC ] = AbsLevelPass1[ xC ][ yC ] +2 * abs_remainder[ n ]
      }
      for( n = firstPosMode1; n >= 0; n− − ) {
         xC = ( xS << log2SbW ) + DiagScanOrder[ log2SbW ][ log2SbH ][ n ][ 0 ]
         yC = ( yS << log2SbH ) + DiagScanOrder[ log2SbW ][ log2SbH ][ n ][ 1 ]
         dec_abs_level[ n ]
         if(AbsLevel[ xC ][ yC ] > 0 )
            firstSigScanPosSb = n
         if( dep_quant_enabled_flag )
            QState = QStateTransTable[ QState ][ AbsLevel[ xC ][ yC ] & 1 ]
      }
      if( dep_quant_enabled_flag || !sign_data_hiding_enabled_flag )
         signHidden = 0
      else
         signHidden = ( lastSigScanPosSb − firstSigScanPosSb > 3 ? 1 : 0 )
      for( n = numSbCoeff − 1; n >= 0; n− − ) {
         xC = ( xS << log2SbW ) + DiagScanOrder[ log2SbW ][ log2SbH ][ n ][ 0 ]
         yC = ( yS << log2SbH ) + DiagScanOrder[ log2SbW ][ log2SbH ][ n ][ 1 ]
         if( (AbsLevel[ xC ][ yC ] > 0 ) &&
            ( !signHidden || ( n != firstSigScanPosSb ) ) )
            coeff_sign_flag[ n ]
      }
      if( dep_quant_enabled_flag ) {
         QState = startQStateSb
         for( n = numSbCoeff − 1; n >= 0; n− − ) {
            xC = ( xS << log2SbW ) + DiagScanOrder[ log2SbW ][ log2SbH ][ n ][ 0 ]
            yC = ( yS << log2SbH ) + DiagScanOrder[ log2SbW ][ log2SbH ][ n ][ 1 ]
            if( AbsLevel[ xC ][ yC ] > 0 )
               TransCoeffLevel[ x0 ][ y0 ][ cIdx ][ xC ][ yC ] =
                  ( 2 * AbsLevel[ xC ][ yC ] − ( QState > 1 ? 1 : 0 ) ) *
                  ( 1 − 2 * coeff_sign_flag[ n ] )
            QState = QStateTransTable[ QState ][ par_level_flag[ n ] ]
      } else {
         sumAbsLevel = 0
         for( n = numSbCoeff − 1; n >= 0; n− − ) {
            xC = ( xS << log2SbW ) + DiagScanOrder[ log2SbW ][ log2SbH ][ n ][ 0 ]
            yC = ( yS << log2SbH ) + DiagScanOrder[ log2SbW ][ log2SbH ][ n ][ 1 ]
            if( AbsLevel[ xC ][ yC ] > 0 ) {
               TransCoeffLevel[ x0 ][ y0 ][ cIdx ][ xC ][ yC ] =
                  AbsLevel[ xC ][ yC ] * ( 1 − 2 * coeff_sign_flag[ n ] )
               if( signHidden ) {
                  sumAbsLevel += AbsLevel[ xC][ yC ]
                  if( ( n = = firstSigScanPosSb ) && ( sumAbsLevel % 2 ) = = 1 ) )
                     TransCoeffLevel[ x0 ][ y0 ][ cIdx ][ xC ][ yC ] =
                        −TransCoeffLevel[ x0 ][ y0 ][ cIdx ][ xC ][ yC ]
               }
            }
         }
      }
   }
}
``` | ae(v)<br><br><br><br><br><br><br><br><br><br><br><br>ae(v)<br><br><br><br><br><br><br><br><br><br><br><br><br>ae(v) |

TABLE 13

| | Descriptor |
|---|---|
| ```
residual_ts_coding( x0, y0, log2TbWidth, log2TbHeight, cIdx ) {
   log2SbSize = ( Min( log2TbWidth, log2TbHeight ) < 2 ? 1 : 2 )
   numSbCoeff = 1 <<( log2SbSize << 1 )
   lastSubBlock = ( 1 << ( log2TbWidth + log2TbHeight − 2 * log2SbSize ) ) − 1
``` | |

TABLE 13-continued

Descriptor

```
    inferSbCbf = 1
    MaxCcbs = 2 * ( 1 << log2TbWidth ) * ( 1<< log2TbHeight )
    for( i =0; i <= lastSubBlock; i++ ) {
      xS = DiagScanOrder[ log2TbWidth − log2SbSize ][ log2TbHeight − log2SbSize ][ i ][ 0 ]
      yS = DiagScanOrder[ log2TbWidth − log2SbSize ][ log2TbHeight − log2SbSize ][ i ][ 1 ]
      if( ( i != lastSubBlock || !inferSbCbf ) {
        coded_sub_block_flag[ xS ][ yS ]                                                    ae(v)
      }
      if( coded_sub_block_flag[ xS ][ yS ] && i < lastSubBlock )
        inferSbCbf = 0
  /* First scan pass */
      inferSbSigCoeffFlag = 1
      for( n = 0; n <= numSbCoeff − 1; n++ ) {
        xC = ( xS << log2SbSize ) + DiagScanOrder[ log2SbSize ][ log2SbSize ][ n ][ 0 ]
        yC = ( yS << log2SbSize ) + DiagScanOrder[ log2SbSize ][ log2SbSize ][ n ][ 1 ]
        if( coded_sub_block_flag[ xS ][ yS ] &&
          ( n != numSbCoeff − 1 || !inferSbSigCoeffFlag ) ) {
          sig_coeff_flag[ xC ][ yC ]                                                         ae(v)
          MaxCcbs− −
          if( sig_coeff_flag[ xC ][ yC ] )
            inferSbSigCoeffFlag = 0
        }
        CoeffSignLevel[ xC ][ yC ] = 0
        if( sig_coeff_flag[ xC ][ yC ] {
          coeff_sign_flag[ n ]                                                               ae(v)
          MaxCcbs− −
          CoeffSignLevel[ xC ][ yC ] = ( coeff_sign_flag[ n ] > 0 ? −1 : 1 )
          abs_level_gtx_flag[ n ][ 0 ]                                                       ae(v)
          MaxCcbs− −
          if( abs_level_gtx_flag[ n ][ 0 ] ) {
            par_level_flag[ n ]                                                              ae(v)
            MaxCcbs− −
          }
        }
        AbsLevelPassX[ xC ][ yC ] =
          sig_coeff_flag[ xC ][ yC ] + par_level_flag[ n ] + abs_level_gtx_flag[ n ][ 0 ]
      }
  /* Greater than X scan pass (numGtXFlags=5) */
      for( n = 0; n <= numSbCoeff − 1; n++ ) {
        xC = ( xS << log2SbSize ) + DiagScanOrder[ log2SbSize ][ log2SbSize ][ n ][ 0 ]
        yC = ( yS << log2SbSize ) + DiagScanOrder[ log2SbSize ][ log2SbSize ][ n ][ 1 ]
        for( j = 1; j < 5; j++ ) {
          if( abs_level_gtx_flag[ n ][ j − 1 ] )
            abs_level_gtx_flag[ n ][ j ]                                                     ae(v)
          MaxCcbs− −
          AbsLevelPassX[ xC ][ yC ] + = 2 * abs_level_gtx_flag[ n ][ j ]
        }
      }
  /* remainder scan pass */
      for( n = 0; n <= numSbCoeff − 1; n++ ) {
        xC = ( xS << log2SbSize ) + DiagScanOrder[ log2SbSize ][ log2SbSize ][ n ][ 0 ]
        yC = ( yS << log2SbSize ) + DiagScanOrder[ log2SbSize ][ log2SbSize ][ n ][ 1 ]
        if( abs_level_gtx_flag[ n ][ 4 ] )
          abs_remainder[ n ]                                                                 ae(v)
        if( intra_bdpcm_flag == 0 ) {
          absRightCoeff = abs( TransCoeffLevel[ x0 ][ y0 ][ cIdx ][ xC − 1 ][ yC ] )
          absBelowCoeff = abs( TransCoeffLevel[ x0 ][ y0 ][ cIdx ][ xC ][ yC − 1 ] )
          predCoeff = Max( absRightCoeff, absBelowCoeff )
          if( AbsLevelPassX[ xC ][ yC ] + abs_remainder[ n ] == 1 && predCoeff >
0 )
            TransCoeffLevel[ x0 ][ y0 ][ cIdx ][ xC ][ yC ] =
              ( 1 − 2 * coeff_sign_flag[ n ] ) * predCoeff
          else if( AbsLevelPassX[ xC ][ yC ] + abs_remainder[ n ] <= predCoeff )
            TransCoeffLevel[ x0 ][ y0 ][ cIdx ][ xC ][ yC ] = ( 1 − 2 * coeff_sign_flag[ n ] ) *
              ( AbsLevelPassX[ xC ][ yC ] + abs_remainder[ n ] − 1)
          else
            TransCoeffLevel[ x0 ][ y0 ][ cIdx ][ xC ][ yC ] = ( 1 − 2 * coeff_sign_flag[ n ] ) *
              ( AbsLevelPassX[ xC ][ yC ] + abs_remainder[ n ] )
        } else
          TransCoeffLevel[ x0 ][ y0 ][ cIdx ][ xC ][ yC ] = ( 1 − 2 * coeff_sign_flag[ n ] ) *
            ( AbsLevelPassX[ xC ][ yC ] + abs_remainder[ n ] )
      }
    }
  }
```

Table 11 shows that residual coding is branched according to the value of transform_skip_flag, that is, different syntax elements are used for the residual. In addition, Table 12 shows residual coding in the case of transform_skip_flag having a value of 0, that is, in the case of the transform being applied, and Table 13 shows residual coding in the case of transform_skip_flag having a value of 1, that is, in the case of the transform not being applied.

In Tables 12 and 13, par_level_flag may be expressed as Equation 6 below.

$$par\_level\_flag = coeff \ \& \ 1 \qquad \text{[Equation 6]}$$

In addition, in Tables 12 and 13, since par_level_flag is parsed, that is, decoded after abs_level_gtx_flag, rem_abs_gt1_flag may indicate whether or not the transform coefficient at the corresponding scanning position n is greater than 1, and rem_abs_gt2_flag may indicate whether or not the transform coefficient at the corresponding scanning position n is greater than 3. That is, rem_abs_gt2_flag in Table 1 may be expressed as rem_abs_gt3_flag in Tables 12 and 13.

When Equations 2 to 3 are changed as described above, Equation 4 may be changed as follows in the case of following Tables 12 and 13.

$$|coeff| = sig\_coeff\_flag + par\_level\_flag + rem\_abs\_gt1\_flag + 2*(rem\_abs\_gt2\_flag + abs\_remainder \qquad \text{[Equation 7]}$$

Figure 16:
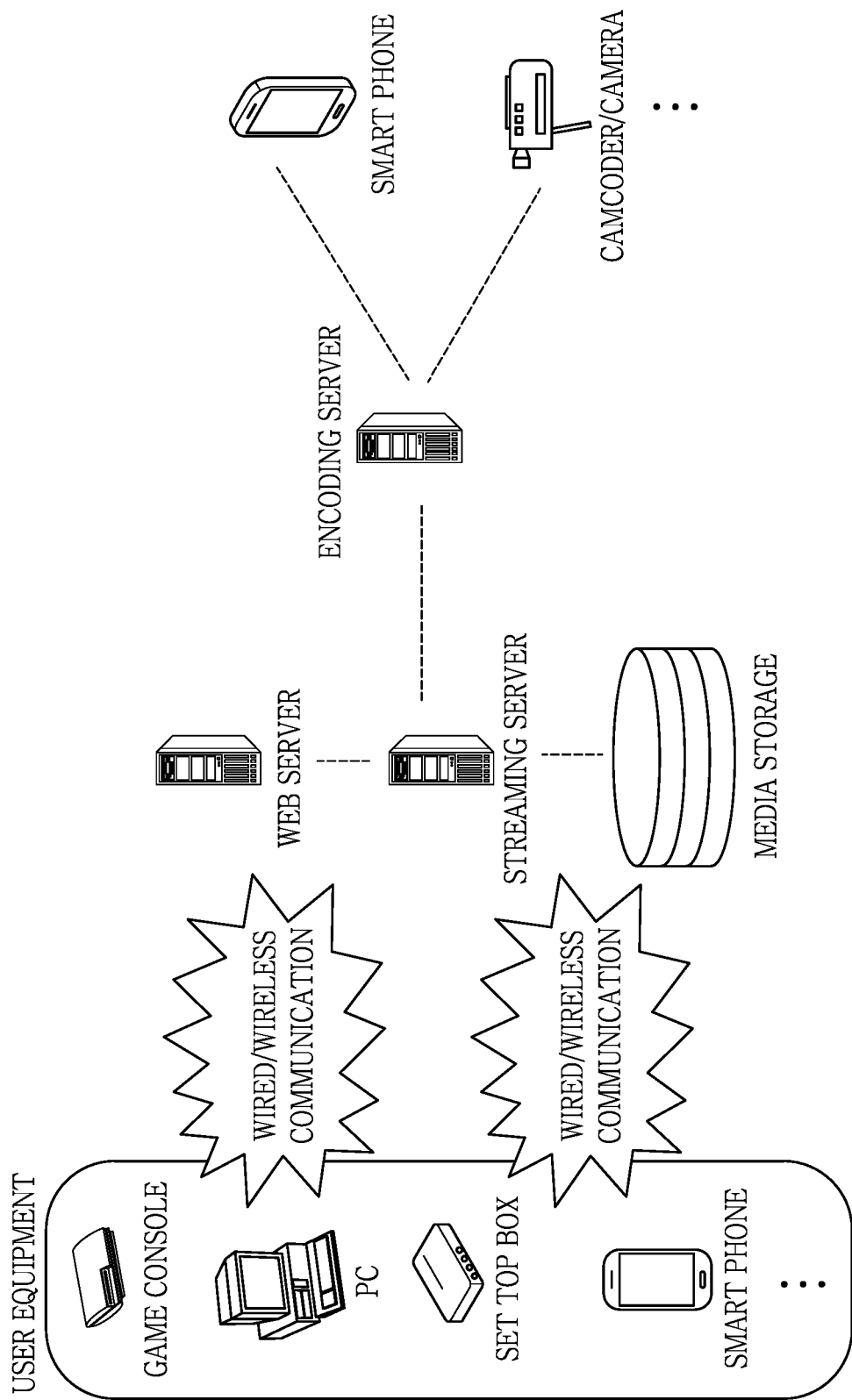
FIG. 16 illustratively represents a content streaming system structure diagram to which the present disclosure may be applied.

FIG. 16 represents an example of a contents streaming system to which the present document may be applied.

Referring to FIG. 16, the content streaming system to which the present document is applied may generally include an encoding server, a streaming server, a web server, a media storage, a user device, and a multimedia input device.

The encoding server functions to compress to digital data the contents input from the multimedia input devices, such as the smart phone, the camera, the camcorder and the like, to generate a bitstream, and to transmit it to the streaming server. As another example, in a case where the multimedia input device, such as, the smart phone, the camera, the camcorder or the like, directly generates a bitstream, the encoding server may be omitted.

The bitstream may be generated by an encoding method or a bitstream generation method to which the present document is applied. And the streaming server may temporarily store the bitstream in a process of transmitting or receiving the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipments in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the contents streaming system may be operated as a distributed server, and in this case, data received by each server may be processed in distributed manner.

What is claimed is:

1. An image decoding method performed by a decoding apparatus, the method comprising:
   obtaining residual information from a bitstream;
   deriving a quantized transform coefficient for a current block based on the residual information;
   deriving a transform coefficient for the current block by performing a dequantization for the quantized transform coefficient;
   deriving a residual sample for the current block based on the transform coefficient; and
   generating a reconstructed picture based on the residual sample for the current block,
   wherein the residual information includes transform coefficient level flags related to whether or not a transform coefficient level for the quantized transform coefficient is greater than predetermined thresholds, and
   wherein a number of the transform coefficient level flags is based on whether or not a transform is applied to the current block.

2. The image decoding method of claim 1, wherein the residual information includes a first transform coefficient level flag related to whether or not the transform coefficient level for the quantized transform coefficient is greater than a first threshold value, and a second transform coefficient level flag related to whether or not the transform coefficient level for the quantized transform coefficient is greater than a second threshold value, and
   wherein the second transform coefficient level flag is decoded in different ways based on whether or not the transform is applied to the current block.

3. The image decoding method of claim 1, wherein the residual information includes a context syntax element coded based on a context, and
   wherein the context syntax element includes a significant coefficient flag related to whether or not the quantized transform coefficient is a non-zero significant coefficient, a parity level flag related to a parity of the transform coefficient level for the quantized transform coefficient, a first transform coefficient level flag related to whether or not the transform coefficient level for the quantized transform coefficient is greater than a first threshold value, and a second transform coefficient level flag related to whether or not the transform coefficient level for the quantized transform coefficient is greater than a second threshold value.

4. The image decoding method of claim 3, wherein the deriving the quantized transform coefficient comprises:
   decoding the first transform coefficient level flag and decoding the parity level flag; and
   deriving the quantized transform coefficient based on a value of the decoded parity level flag and a value of the decoded first transform coefficient level flag, and
   wherein the decoding the first transform coefficient level flag is performed prior to the decoding the parity level flag.

5. The image decoding method of claim 1, wherein the residual information is derived through different syntax elements based on whether or not the transform is applied to the current block.

6. An image encoding method performed by an encoding apparatus, the method comprising:
- deriving a residual sample for a current block;
- deriving a transform coefficient for the current block based on the residual sample;
- deriving a quantized transform coefficient for the current block by performing a quantization for the transform coefficient, and
- encoding residual information including information on the quantized transform coefficient to output a bitstream,
- wherein the residual information includes transform coefficient level flags related to whether or not a transform coefficient level for the quantized transform coefficient is greater than predetermined thresholds, and
- wherein a number of the transform coefficient level flags is based on whether or not a transform is applied to the current block.

7. The image encoding method of claim 6, wherein the residual information includes a first transform coefficient level flag related to whether or not the transform coefficient level for the quantized transform coefficient is greater than a first threshold value, and a second transform coefficient level flag related to whether or not the transform coefficient level for the quantized transform coefficient is greater than a second threshold value, and
- wherein the second transform coefficient level flag is decoded in different ways based on whether or not the transform is applied to the current block.

8. The image encoding method of claim 6, wherein the residual information includes a context syntax element coded based on a context, and
- wherein the context syntax element includes a significant coefficient flag related to whether or not the quantized transform coefficient is a non-zero significant coefficient, a parity level flag related to a parity of the transform coefficient level for the quantized transform coefficient, a first transform coefficient level flag related to whether or not the transform coefficient level for the quantized transform coefficient is greater than a first threshold value, and a second transform coefficient level flag related to whether or not the transform coefficient level for the quantized transform coefficient is greater than a second threshold value.

9. The image encoding method of claim 8, wherein the deriving the quantized transform coefficient comprises:
- encoding the first transform coefficient level flag and encoding the parity level flag; and
- deriving the quantized transform coefficient based on a value of the parity level flag and a value of the first transform coefficient level flag, and
- wherein the encoding the first transform coefficient level flag is performed prior to the encoding the parity level flag.

10. The image encoding method of claim 6, wherein the residual information is derived through different syntax elements based on whether or not the transform is applied to the current block.

11. A non-transitory computer-readable digital storage medium storing a bitstream generated by an image encoding method, the method comprising:
- deriving a residual sample for a current block;
- deriving a transform coefficient for the current block based on the residual sample;
- deriving a quantized transform coefficient for the current block by performing a quantization for the transform coefficient, and
- encoding residual information including information on the quantized transform coefficient to output the bitstream,
- wherein the residual information includes transform coefficient level flags related to whether or not a transform coefficient level for the quantized transform coefficient is greater than predetermined thresholds, and
- wherein a number of the transform coefficient level flags is based on whether or not a transform is applied to the current block.

12. The non-transitory computer-readable digital storage medium of claim 11, wherein the residual information includes a first transform coefficient level flag related to whether or not the transform coefficient level for the quantized transform coefficient is greater than a first threshold value, and a second transform coefficient level flag related to whether or not the transform coefficient level for the quantized transform coefficient is greater than a second threshold value, and
- wherein the second transform coefficient level flag is decoded in different ways based on whether or not the transform is applied to the current block.

13. The non-transitory computer-readable digital storage medium of claim 11, wherein the residual information includes a context syntax element coded based on a context, and
- wherein the context syntax element includes a significant coefficient flag related to whether or not the quantized transform coefficient is a non-zero significant coefficient, a parity level flag related to a parity of the transform coefficient level for the quantized transform coefficient, a first transform coefficient level flag related to whether or not the transform coefficient level for the quantized transform coefficient is greater than a first threshold value, and a second transform coefficient level flag related to whether or not the transform coefficient level for the quantized transform coefficient is greater than a second threshold value.

14. The non-transitory computer-readable digital storage medium of claim 13, wherein the deriving the quantized transform coefficient comprises:
- encoding the first transform coefficient level flag and encoding the parity level flag; and
- deriving the quantized transform coefficient based on a value of the parity level flag and a value of the first transform coefficient level flag, and
- wherein the encoding the first transform coefficient level flag is performed prior to the encoding the parity level flag.

* * * * *